United States Patent
Usami

(10) Patent No.: US 9,397,555 B2
(45) Date of Patent: Jul. 19, 2016

(54) AC-DC POWER CONVERSION CIRCUIT WITH CURRENT HARMONIC SUPPRESSION

(71) Applicant: TOSHIBA TEC KABUSHIKI KAISHA, Shingawa-ku, Tokyo (JP)

(72) Inventor: Yutaka Usami, Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 123 days.

(21) Appl. No.: 14/497,638

(22) Filed: Sep. 26, 2014

(65) Prior Publication Data

US 2015/0109839 A1 Apr. 23, 2015

(30) Foreign Application Priority Data

Oct. 22, 2013 (JP) ................................ 2013-219545

(51) Int. Cl.
*H02M 1/08* (2006.01)
*H02M 1/12* (2006.01)
*H02M 7/217* (2006.01)
*H02M 1/42* (2007.01)
*H02M 1/38* (2007.01)

(52) U.S. Cl.
CPC .............. *H02M 1/4208* (2013.01); *H02M 1/12* (2013.01); *H02M 1/425* (2013.01); *H02M 1/38* (2013.01); *Y02B 70/126* (2013.01)

(58) Field of Classification Search
CPC ......... H02M 1/12; H02M 1/126; H02M 1/38; H02M 7/12; H02M 7/217; H02M 7/219; H02M 2007/2195; Y02B 70/12; Y02B 70/126
USPC .......................................... 363/123, 125, 127
See application file for complete search history.

(56) References Cited

U.S. PATENT DOCUMENTS

2008/0130337 A1* 6/2008 Takahashi ........... H02M 1/4225
363/126
2013/0308358 A1* 11/2013 Usami ................... H02M 7/217
363/84

FOREIGN PATENT DOCUMENTS

| JP | 2013-223408 | 10/2013 |
|----|-------------|---------|
| JP | 5523508 | 1/2014 |
| JP | 2014-039418 | 2/2014 |

* cited by examiner

*Primary Examiner* — Emily P Pham
*Assistant Examiner* — Jye-June Lee
(74) *Attorney, Agent, or Firm* — Amin, Turocy & Watson LLP

(57) ABSTRACT

A controller outputs a pulse signal to a first switch and a second switch on the basis of a circuit current flowing through a power conversion circuit and a voltage of an alternating-current power supply. The first switch and the second switch alternately open and close. According to the opening and closing, an electric current in which a high-frequency current is mixed with a low-frequency component of the alternating-current power supply flows to the power conversion circuit.

5 Claims, 27 Drawing Sheets

AC-DC POWER CONVERSION CIRCUIT WITH CURRENT HARMONIC SUPPRESSION

CROSS-REFERENCE TO RELATED APPLICATION

This application is based upon and claims the benefit of priority from Japanese Patent Application No. 2013-219545, filed Oct. 22, 2013, the entire contents of which are incorporated herein by reference.

FIELD

Embodiments described herein relate generally to a power converting apparatus that converts an alternating-current voltage obtained from an alternating-current power supply into a direct-current voltage and supplies electric power to a load.

BACKGROUND

As a method of converting an alternating-current voltage into a direct-current voltage, two methods explained below are generally known.

In a first method, a diode bridge circuit and a smoothing capacitor are used. The diode bridge circuit full-wave rectifies an alternating current supplied from an alternating-current power supply. The smoothing capacitor smoothes a full-wave rectified direct current.

In the first method, an electric current always flows through a series circuit of two diodes irrespective of whether the alternating-current voltage is positive or negative. When the electric current flows, in each of the two diodes, a power loss equivalent to a product of the electric current flowing through the diode and a forward voltage of the diode occurs.

In a second method, a power factor improving converter (PFC) is interposed between the diode bridge circuit and the smoothing capacitor in the first method. The power factor improving converter steps up a direct-current voltage full-wave rectified by the diode bridge circuit.

In the second method, as in the first method, since an electric current flows through the series circuit of the two diodes when the full-wave rectification is performed, a power loss occurs. In addition, since the electric current alternately flows to a field effect transistor (FET) and a diode included in the power factor improving converter, a further power loss occurs.

Since the power factor improving converters needs to convert a waveform of an input current into a sine wave, an output voltage has to be set higher than an input voltage. However, a voltage necessary in a load is not always a voltage higher than the input voltage. In that case, a step-down converter is connected in a post stage of the power factor improving converter. The step-down converter steps down the voltage stepped up by the power factor improving converter to a desired voltage. A power loss also occurs in the step-down. An entire power converting apparatus has a three-stage configuration of AC-DC conversion, DC-DC (step-up) conversion, and DC-DC (step-down) conversion. The power loss appears as a product of power losses in the three stages. For example, if it is assumed that efficiency per one stage is 0.95, efficiency in the three stages is 0.95×0.95×0.95=0.86. That is, excellent conversion at the efficiency of 95% falls to 86% if the three stages are connected. In this way, even if conversion efficiency of each stage is high, the conversion efficiency is markedly deteriorated in multiple stages.

Recently, in the public, there is an increasing power saving request for electronic apparatuses. At the same time, it is also an essential condition that current harmonic noise is not emitted to prevent an external environment from being adversely affected. Therefore, it is demanded to attain both of conversion efficiency improvement and a current harmonic suppression effect of a power converting apparatus that supplies electric power to a load.

The related art is described in JP-A-2007-110869 and JP-A-2008-295248.

DETAILED DESCRIPTION

It is an object of embodiments to attain both of conversion efficiency improvement and a current harmonic suppression effect of a power converting apparatus that supplies electric power to a load.

Embodiments are explained below with reference to the drawings.

First Embodiment

Figure 1:
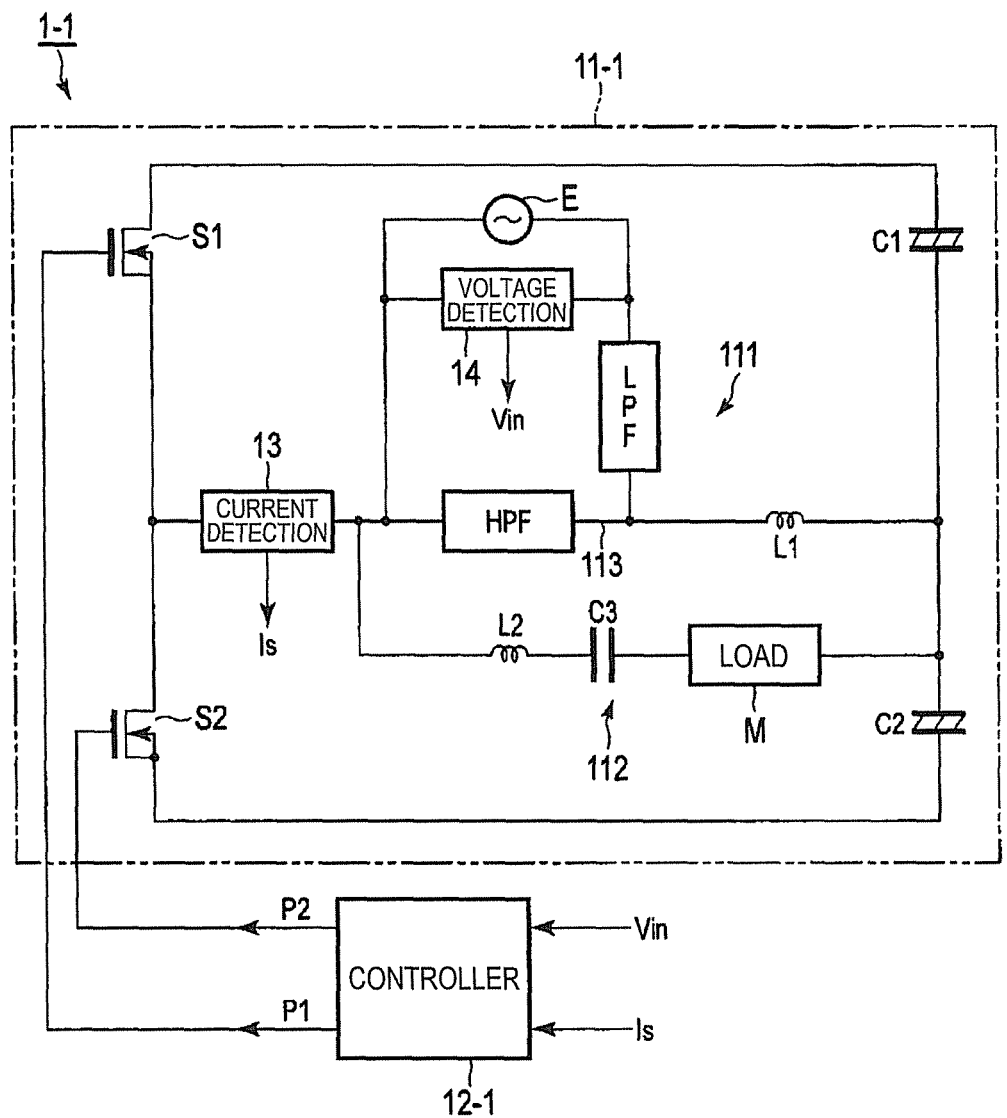
FIG. 1 is a circuit configuration diagram of a power converting apparatus in a first embodiment.

FIG. 1 is a circuit configuration diagram of a power converting apparatus 1-1 in a first embodiment. The power converting apparatus 1-1 includes a power conversion circuit 11-1 and a controller (a control section) 12-1 for the power conversion circuit 11-1.

The power conversion circuit 11-1 includes first and second semiconductor switches (hereinafter simply referred to as switches) S1 and S2, first and second smoothing capacitors (hereinafter simply referred to as capacitors) C1 and C2, first and second inductors L1 and L2, a third capacitor C3, a low-pass filter LPF, and a high-pass filter HPF. As both of the first and second switches S1 and S2, an N-type channel MOS field effect transistor (MOSFET) is used.

In the power conversion circuit 11-1, a source terminal of the first switch S1 is connected to a drain terminal of the second switch S2. The first capacitor C1 and the second capacitor C2 are connected in series. Further, a terminal of the first capacitor C1 on a side not connected to the second capacitor C2 is connected to a drain terminal of the first switch. A terminal of the second capacitor C2 on a side not connected to the first capacitor C1 is connected to a source terminal of the second switch.

In the power conversion circuit 11-1, a connection point of the first switch S1 and the second switch S2 and a connection point of the first capacitor C1 and the second capacitor C2 are connected by a parallel circuit of a first series circuit 111 formed by connecting in series an alternating-current power supply E, the low-pass filter LPF, and the first inductor L1 in order and a second series circuit 112 formed by connecting in series the second inductor L2, the third capacitor C3, and a load M in order. The power conversion circuit 11-1 includes a route 113 that bypasses the alternating-current power supply E and the low-pass filter LPF. The high-pass filter HPF is interposed in the route 113.

The power converting apparatus 1-1 includes a circuit-current detecting unit (a circuit-current detecting section in claims) 13 that detects a circuit current Is of the power conversion circuit 11-1 and a power-supply-voltage detecting unit (a power-supply-voltage detecting section) 14 that detects a power supply voltage Vin of the power conversion circuit 11-1. The circuit current detecting unit 13 detects a circuit current Is flowing through the parallel circuit. The power-supply-voltage detecting unit 14 is connected to the alternating-current power supply E in parallel and detects the voltage Vin of the alternating-current power supply E.

The circuit-current detecting unit 13 gives the detected circuit current Is to the controller 12-1. The power-supply-voltage detecting unit 14 gives the detected power supply voltage Vin to the controller 12-1.

The controller 12-1 generates, on the basis of the circuit current Is and the power supply voltage Vin, first and second pulse signals P1 and P2 for causing the first switch S1 and the second switch S2 to perform a switching operation. The controller 12-1 supplies the first pulse signal P1 to a gate terminal of the first switch S1 and supplies the second pulse signal P2 to a gate terminal of the second switch S2.

The first switch S1 conducts while the first pulse signal P1 is supplied to the gate terminal. The second switch S2 conducts while the second pulse signal P2 is supplied to the gate terminal.

In such a circuit configuration, in this embodiment, a commercial power supply of 100 V [volts] and 50 Hz [hertz] is used as the alternating-current power supply E. It is assumed that electric power of 200 W [watt] is supplied to the load M. In this case, since the voltage is 100 V, an electric current of 2 A [amperes] is necessary to obtain the electric power of 200 W. That is, the electric power of 200 W can be supplied to the load M if an electric current passing through the low-pass filter LPF and flowing into the alternating-current power supply E is finally 2 A.

An electric current passing through the low-pass filter LPF is an electric current of a low-frequency component of 50 Hz. On the other hand, an electric current passing through the high-pass filter HPF is, for example, an electric current of a high-frequency component of 100 KHz. That is, in the circuit current Is, the electric current of the low-frequency component (50 Hz) and an electric current of the high-frequency component (100 KHz) are mixed. Consequently, the entire power conversion circuit 11-1 operates with mixture of alternating currents having the different two frequencies.

The electric current of the high-frequency component (100 KHz) is obtained by alternately opening and closing the first switch S1 and the second switch S2 at high speed. To alternately open and close the first switch S1 and the second switch S2, it is sufficient to generate a pair of positive and negative sine wave-like envelopes for defining peaks of the circuit current Is and alternately switch the first switch S1 and the second switch S2 such that the direction of an electric current is switched between the envelopes. This procedure is explained with reference to FIG. 2.

Figure 2:
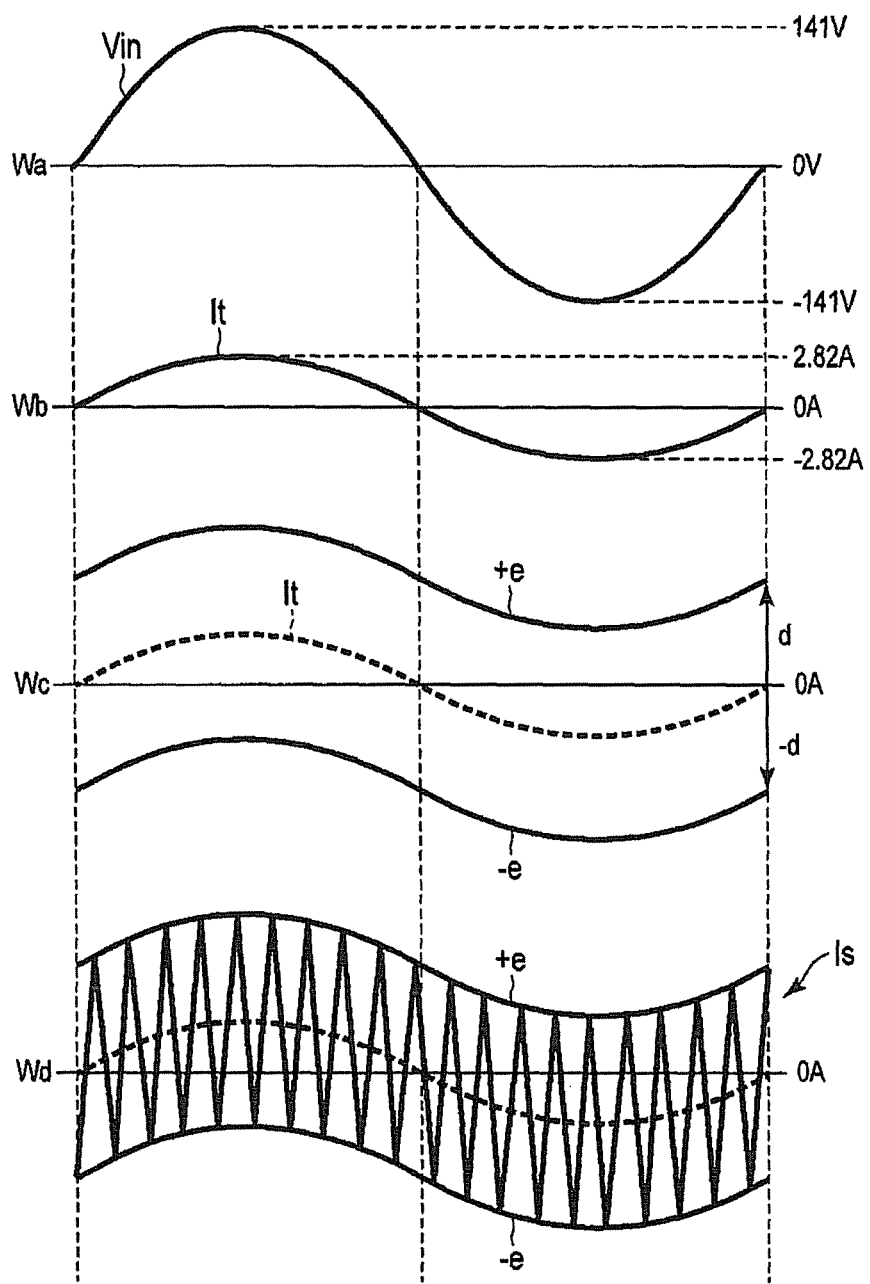
FIG. 2 is a waveform chart used for explanation of an envelope generation procedure in the first embodiment.

A waveform Wa shown in FIG. 2 indicates the power supply voltage Vin. In the case of the alternating-current power supply E, the power supply voltage Vin changes in a sine wave shape. If the alternating-current power supply E is a commercial power supply of 100 V, a waveform of the power supply voltage Vin detected by the power-supply-voltage detecting unit 14 is a sine wave, a positive peak value of which is 141 V and a negative peak value of which is −141 V as indicated by the waveform Wa. Therefore, in this embodiment, sine wave-like envelopes are created on the basis of the waveform of the power supply voltage Vin. An electric current of 2 A is fed to the alternating-current power supply E in a sine wave shape having a cycle equal to the cycle of the power supply voltage.

A waveform Wb shown in FIG. 2 indicates a current waveform of 2 A in a sine wave shape having a cycle equal to the cycle of the power supply voltage. As shown in the figure, a positive peak value of the waveform is 2.82 A and a negative peak value of the waveform is −2.82 A. That is, a value obtained by multiplying the power supply voltage Vin with a coefficient k=0.02 is a target current value It.

A waveform Wc shown in FIG. 2 indicates sine wave-like envelopes (current peak target values) necessary as a reference for switching the direction of the circuit current Is. The envelopes include a positive envelope +e for determining a reference for switching the direction of the positive circuit current Is and a negative envelope −e for determining a reference for switching the direction of the negative circuit current Is. The positive envelope +e is generated by adding width d to the target current value It. The negative envelope −e is generated by subtracting the width d from the target current value It. The width d is a value obtained by adding a slight margin to a negative (positive) peak value of the positive (negative) envelope +e (−e). This is for the purpose of leaving the envelope on the positive (negative) side if a current value is at the negative (positive) peak.

In the waveform Wb, a positive peak value is 2.82 A and a negative peak value is −2.82 A. If the target current value It is the waveform Wb, the width d is set to, for example, "3". Consequently, if the electric current is at the peak on the negative side, the positive envelope +e is 0.18 (=−2.82+3) and the envelope +e can be maintained in a positive region. Similarly, if the electric current is at the peak on the positive side, the negative envelope −e is −0.18 (=2.82−3) and the envelope −e can be maintained in a negative region.

The controller 12-1 generates the first pulse signal P1 and the second pulse signal P2 such that the first switch S1 and the second switch S2 open and close oppositely when the circuit current Is reaches the positive envelope +e and when the circuit current Is reaches the negative envelope −e. Then, in the circuit current Is, as indicated by a waveform Wd, a high-frequency component (100 KHz) generated by the opening and closing of the first switch S1 and the second switch 32 is mixed with a low-frequency component (50 Hz) having a cycle equal to the cycle of the power supply voltage. Note that the frequency of the high-frequency component is not fixed and is determined by the positive and negative envelopes +e and −e.

The circuit current Is in which the low-frequency component and the high-frequency component are mixed flows to the power conversion circuit 11-1. The circuit current Is flows to the load M through the second inductor L2 and the third capacitor C3. A waveform We shown in FIG. 3 indicates an electric current flowing to the load M, a so-called load current Is2. The capacity of the third capacitor C3 is set to a relatively small capacity for allowing the high-frequency component of 100 KHz to pass but not allowing the low-frequency component of 50 Hz to pass. Then, as indicated by the waveform We, waviness due to the low-frequency component is removed from the load current Is2. Consequently, fixed high-frequency power is always applied to the load M.

Figure 3:
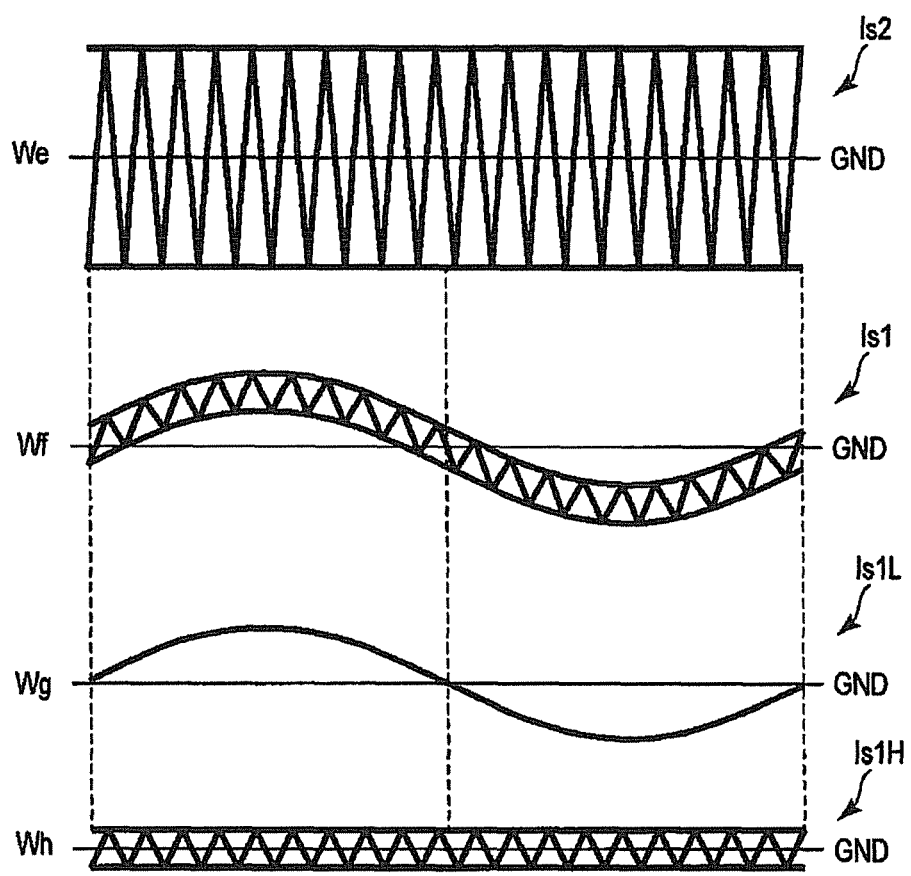
FIG. 3 is a waveform chart used for explanation of the operation of a power conversion circuit in the first embodiment.

In FIG. 3, a waveform Wf indicates a circuit current Is1 flowing through the first series circuit 111. In the circuit current Is1, a low-frequency component of 50 Hz and a high-frequency component of 100 KHz are mixed. The circuit current Is1 is separated into a low-pass filter LPF side and a high-pass filter HPF side. A waveform Wg indicates a circuit current Is1L flowing through the low-pass filter LPF. A waveform Wh indicates a circuit current Is1H flowing through the high-pass filter HPF. As shown in the figure, the low-pass filter LPF allows only the low-frequency component of 50 Hz to pass. Therefore, an electric current flowing into the alternating-current power supply E is the target current value It=2 A.

Note that, in this embodiment, a characteristic of the third capacitor C3 is a capacity for not allowing the low-frequency component of 50 Hz to pass but allowing the high-frequency component of 100 KHz to pass. However, the characteristic of the third capacitor C3 is not limited to the capacity. For example, if the load M is a load heated like a heater, the load M may be driven at any frequency. Therefore, the third capacitor C3 can also be set to a capacity for allowing the low-frequency component to pass to a certain degree.

Figure 4:
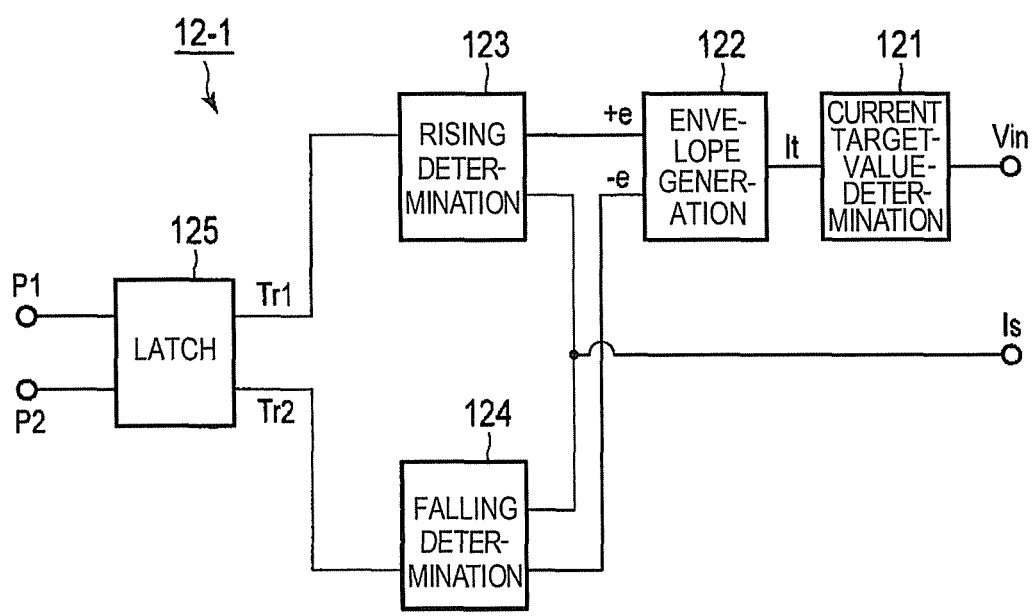
FIG. 4 is a block diagram showing a specific configuration of a controller in the first embodiment.

FIG. 4 is a block diagram showing a specific configuration of the controller 12-1. The controller 12-1 includes a current-target-value determining section 121, an envelope generating section 122, a rising determining section 123, a falling determining section 124, and a latch circuit 125.

The current-target-value determining section 121 receives, as an input, a signal of the power supply voltage Vin detected by the power-supply-voltage detecting unit 14, multiplies the signal with a predetermined coefficient k, and determines the target current value It. The current-target-value determining section 121 supplies a signal equivalent to the current value It to the envelope generating section 122 (a determining section in claims).

The envelope generating section 122 adds the width d to the signal equivalent to the current value It to generate the positive envelope +e. The envelope generating section 122 subtracts the width d from the signal equivalent to the current value It to generate the negative envelope −e. The envelope generating section 122 supplies a signal equivalent to the positive envelope +e to a first input terminal of the rising determining section 123 and supplies a signal equivalent to the negative envelope −e to a first input terminal of the falling determining section 124 (an envelope generating section in claims).

Signals of the circuit current Is detected by the circuit-current detecting unit 13 are respectively supplied to second input terminals of the rising determining section 123 and the falling determining section 124. The rising determining section 123 determines whether the circuit current Is rising between the envelopes, that is, the positive envelope +e and the negative envelope −e comes into contact with the positive envelope +e. Every time the rising determining section 123 detects that the circuit current Is comes into contact with the positive envelope +e, the rising determining section 123 supplies a trigger signal Tr1 to a first input terminal of the latch circuit 125. The falling determining section 124 determines whether the circuit current Is falling between the envelopes comes into contact with the negative envelope −e. Every time the falling determining section 124 detects that the circuit current Is comes into contact with the negative envelope −e, the falling determining section 124 supplies a trigger signal Tr2 to a second input terminal of the latch circuit 125 (the determining section in claims).

If the trigger signal Tr1 is input to the first input terminal, the latch circuit 125 retains the first pulse signal P1 in a state of "0" and retains the second pulse signal P2 in a state of "1". If the trigger signal Tr2 is input to the second input terminal, the latch circuit 125 retains the first pulse signal P1 in the state of "1" and retains the second pulse signal P2 in the state of "0" (a pulse generating section in claims).

Figure 5:
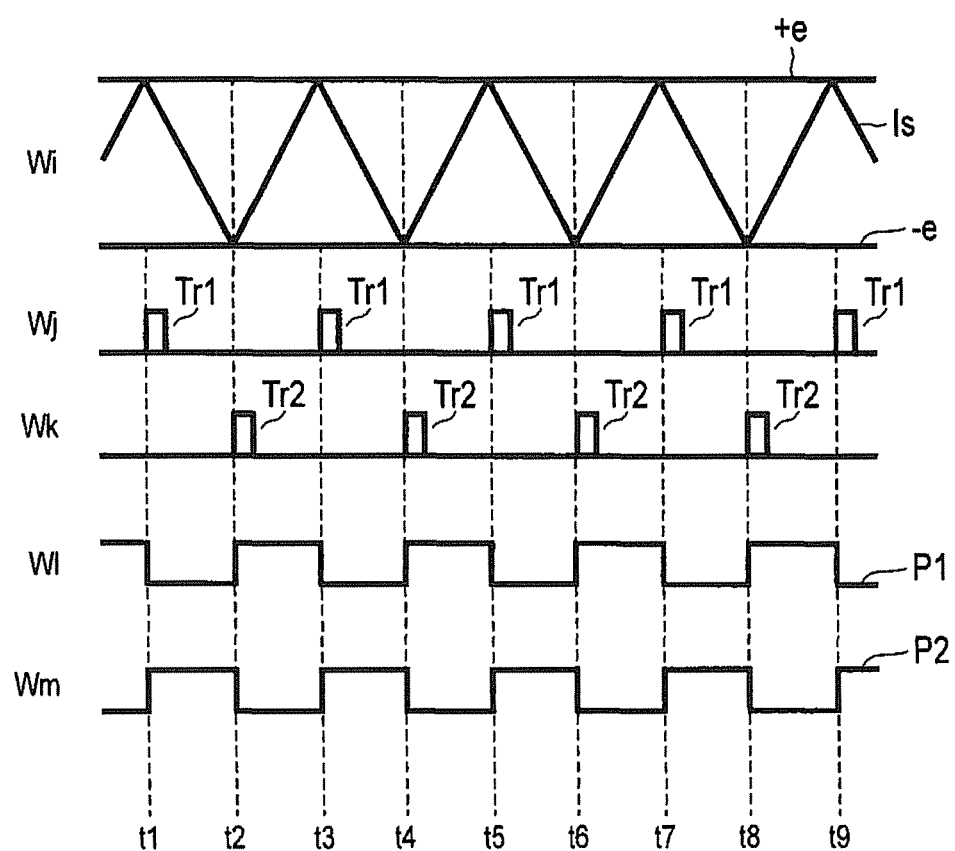
FIG. 5 is a waveform chart used for explanation of the operation of the controller.

FIG. 5 is a signal waveform chart for explaining the operation of the controller 12-1. A waveform Wi indicates a relation between the positive envelope +e and the negative envelope −e generated by the envelope generating section 122 and the circuit current Is in enlargement. A waveform Wj indicates the trigger signal Tr1 output from the rising determining section 123. A waveform Wk indicates the trigger signal Tr2 output from the falling determining section 124. The waveform Wl indicates the first pulse signal P1 output from the latch circuit 125. A waveform Wm indicates the second pulse signal P2 output from the latch circuit 125.

As shown in FIG. 5, when the circuit current Is fluctuating between the envelopes comes into contact with the positive envelope +e (times t1, t3, t5, t7, and t9), the first trigger signal Tr1 is output. Then, the first pulse signal P1 changes to "0" and the second pulse signal P2 changes to "1" and the states of "0" and "1" are retained. As a result, the second switch S2 closes and the first switch S1 opens. Therefore, the circuit current Is turns to decrease.

Thereafter, when the circuit current Is comes into contact with the negative envelope −e (times t2, t4, t6, and t8), the second trigger signal Tr2 is output. Then, the first pulse signal P1 changes to "1" and the second pulse signal P2 changes to "0" and the states of "1" and "0" are retained. As a result, the first switch S1 closes and the second switch S2 opens. Therefore, the circuit current Is turns to rise.

Consequently, the circuit current Is turns between the envelopes and repeats rising and falling. Every time the circuit current Is turns, the first switch S1 and the second switch S2 are alternately switched. As a result, the circuit current Is in which the high-frequency component (100 KHz) is mixed with the low-frequency component (50 Hz) of the alternating-current power supply E flows to the power conversion circuit 11-1. Only the high-frequency component passed through the third capacitor C3 is supplied to the load M. On the other hand, only the low-frequency component passed through the low-pass filter LPF flows to the alternating-current power supply E. Therefore, the high-frequency component does not leak to the outside.

In this way, according to the first embodiment, a sine wave-like current waveform same as a power supply voltage waveform can be generated by the power conversion circuit 11-1 having a simple circuit configuration and the controller 12-1 having a simple functional configuration. This means that a function for suppressing a current harmonic is provided. That is, the power converting apparatus 1-1 including the function for suppressing a current harmonic can be provided at low costs, which is industrially very beneficial.

From the viewpoint of an inverter that drives the load M, the alternating-current power supply E can be converted into a high-frequency alternating current only in one stage. Moreover, width for the high-frequency alternating current can be always fixed irrespective of a low-frequency phase of the power supply voltage. This means that extremely high-efficiency power conversion can be performed, which has an extremely large industrial effect. Since fixed electric power can be supplied to the load M, a stable operation can be realized even if a circuit is simple.

Furthermore, according to this embodiment, only the high-frequency component of the electric current can flow to the load M. If it is desired to perform uniform high-frequency driving not including the low-frequency component, the high-frequency driving is performed very efficiently. Moreover, the high-frequency component can be reduced from the electric current flowing on the first inductor L1 side. Therefore, loads on the low-pass filter LPF and the high-pass filter HPF can be reduced. Specifically, an inductance value of a coil included in the low-pass filter LPF can be reduced and a capacity of a capacitor included in the high-pass filter HPF can be reduced. Therefore, it is possible to reduce the size and the costs of the unit.

Second Embodiment

In the first embodiment, the first pulse signal P1 and the second pulse signal P2 are simultaneously switched. Therefore, there is a risk that the first switch S1 and the second switch S2 are simultaneously turned on at an instance of the switching. To avoid the risk, in a second embodiment, a delay time (a dead time) Δt is provided when the first pulse signal P1 and the second pulse signal P2 are switched to prevent the first switch S1 and the second switch S2 from being simultaneously turned on.

Figure 6:
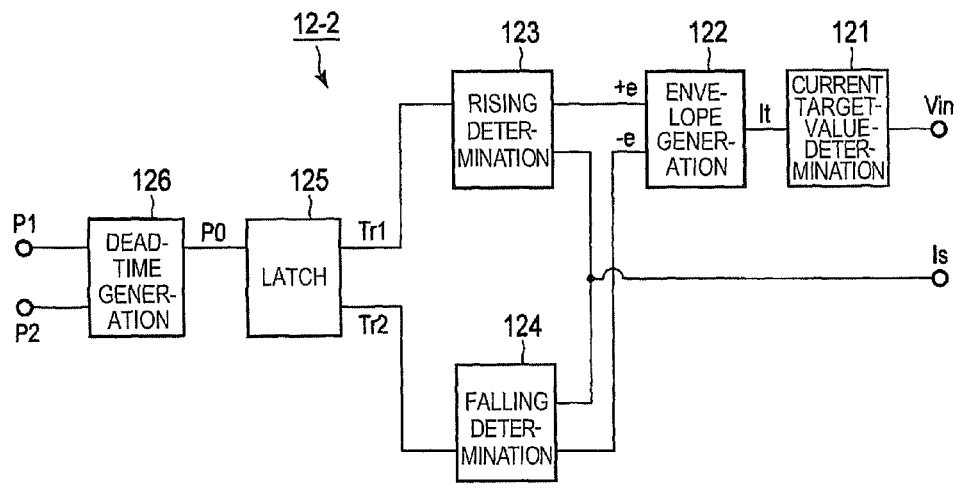
FIG. 6 is a block diagram showing a specific configuration of a controller in a second embodiment.

FIG. 6 is a block diagram showing a specific configuration of a controller 12-2 of a power converting apparatus 1-2 in the second embodiment. Components same as the components of the controller 12-1 in the first embodiment are denoted by the same reference numerals and signs and detailed explanation of the components is omitted. A power conversion circuit 11-2 is the same as the power conversion circuit 11-1 in the first embodiment. Therefore, explanation of the power conversion circuit 11-2 is omitted.

The controller 12-2 includes a dead-time generating section 126 in addition to the current-target-value determining section 121, the envelope generating section 122, the rising determining section 123, the falling determining section 124, and the latch circuit 125. The dead-time generating section 126 receives, as an input, a pulse signal P0 output from the latch circuit 125. The dead-time generating section 126 generates the first pulse signal P1 and the second pulse signal P2 according to the pulse signal P0 and supplies the first pulse signal P1 and the second pulse signal P2 respectively to the first and second switches S1 and S2.

Figure 7:
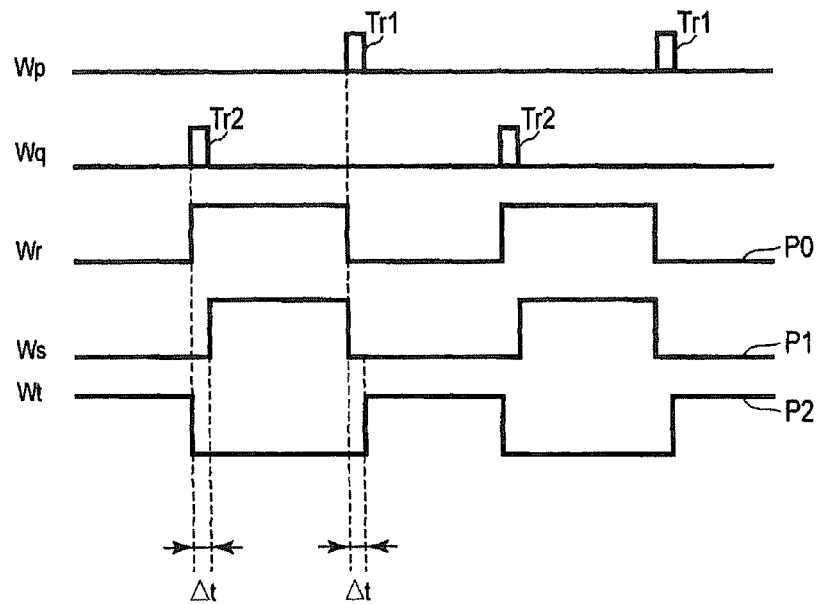
FIG. 7 is a waveform chart used for explanation of the operation of the controller.

FIG. 7 is a signal waveform chart for explaining the operation of the dead-time generating section 126. A waveform Wp indicates the trigger signal Tr1 output from the rising determining section 123. A waveform Wq indicates the trigger signal Tr2 output from the falling determining section 124. A waveform Wr indicates the pulse signal P0 output from the latch circuit 125. A waveform Ws indicates the pulse signal P1 output from the dead-time generating section 126. A waveform Wt indicates a second pulse signal P2 output from the dead-time generating section 126.

As shown in FIG. 7, if the trigger signal Tr2 is input, the latch circuit 125 changes the pulse signal P0 to "1" and retains a state of "1". If the trigger signal Tr1 is input, the latch circuit 125 changes the pulse signal P0 to "0" and retains a state of "0".

If the pulse signal P0 changes to "1", the dead-time generating section 126 changes the second pulse signal P2 to "0" and retains a state of "0". If the predetermined delay time Δt elapses after the pulse signal P2 is changed to "0", the dead-time generating section 126 changes the first pulse signal P1 to "1" and retains a state of "1". If the pulse signal P0 changes to "0", the dead-time generating section 126 changes the first pulse signal P1 to "0" and retains a state of "0". If the predetermined delay time Δt elapses after the pulse signal P0 is changed to "0", the dead-time generating section 126 changes the second pulse signal P2 to "1" and retains a state of "1". The pulse generating section includes a delay section that shifts output timing of the pulse signal P1 to the first switch S1 and output timing of the pulse signal P2 to the second switch S2 to prevent the first switch S1 and the second switch S2 from being simultaneously switched.

In this way, according to the second embodiment, with the action of the dead-time generating section 126, the first pulse signal P1 and the second pulse signal P2 are not simultaneously switched. Therefore, it is possible to avoid the risk that the first switch S1 and the second switch S2 are simultaneously turned on. Further, it goes without saying that action and effects same as the action and effects in the first embodiment are attained.

Third Embodiment

Figure 8:
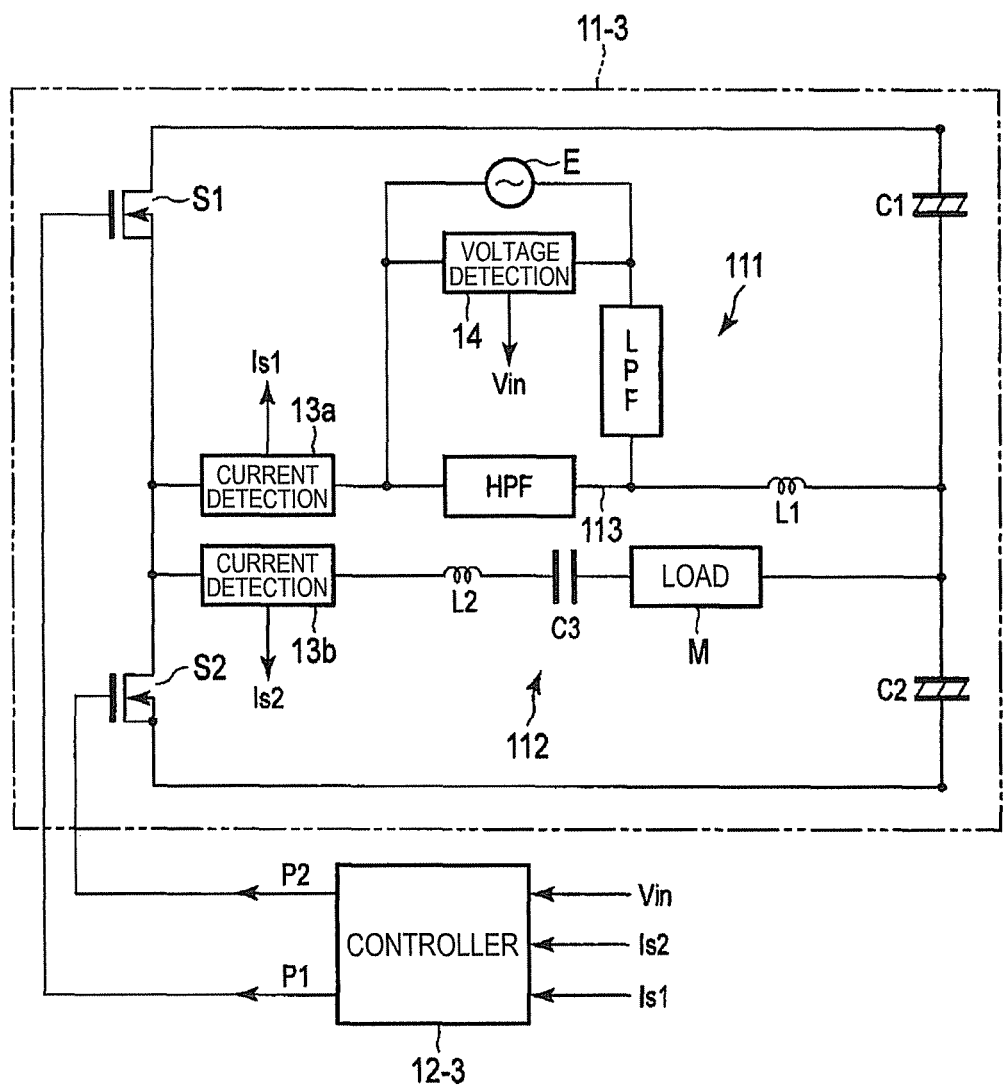
FIG. 8 is a circuit configuration diagram of a power converting apparatus in a third embodiment.

FIG. 8 is a circuit configuration diagram of a power converting apparatus 1-3 in a third embodiment. The power converting apparatus 1-3 includes a power conversion circuit 11-3 and a controller 12-3 for the power conversion circuit 11-3. The power conversion circuit 11-3 includes a first current detecting unit 13a and a second current detecting unit 13b. The first current detecting unit 13a detects the circuit current Is1 flowing through the first series circuit 111 (a first circuit-current detecting section in claims). The second current detecting unit 13b detects the circuit current Is2 flowing through the second series circuit 112 (a second circuit-current detecting section in claims). Since the circuit current Is2 flows through the load M, the circuit current Is2 is referred to as load current Is2. The first current detecting unit 13a and the second current detecting unit 13b respectively give the detected circuit current Is1 and the detected load current Is2 to the controller 12-3.

The controller 12-3 generates the first and second pulse signals P1 and P2 on the basis of the circuit current Is1 and the load current Is2 and the power supply voltage Vin. The controller 12-3 supplies the first pulse signal P1 to the first switch S1 and supplies the second pulse signal P2 to the second switch S2.

Figure 9:
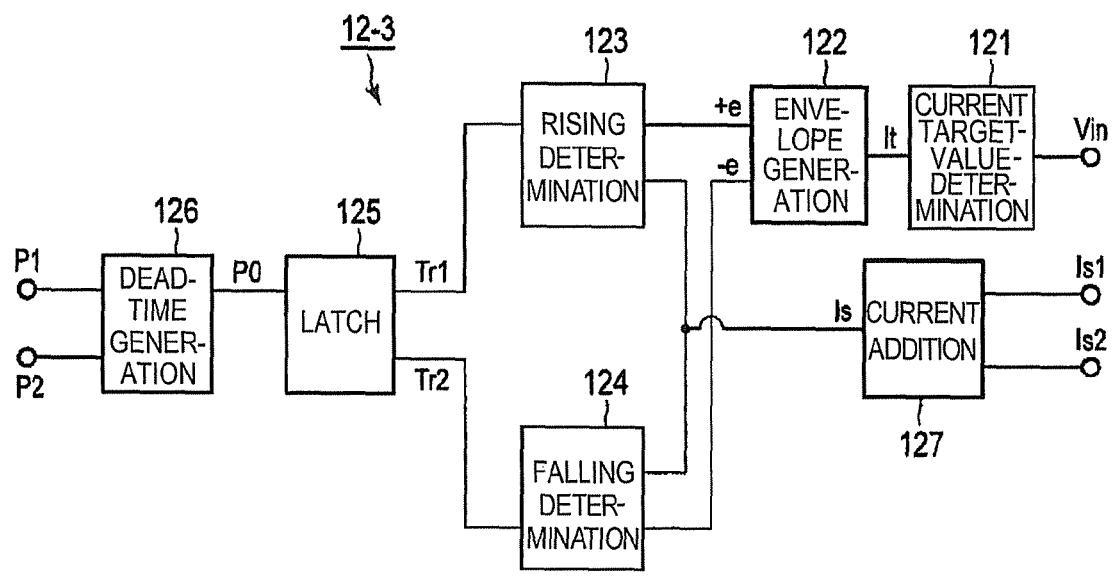
FIG. 9 is a block diagram showing a specific configuration of a controller in the third embodiment.

FIG. 9 is a block diagram showing a specific configuration of the controller 12-3. The controller 12-3 includes a current adding section 127 in addition to the current-target-value determining section 121, the envelope generating section 122, the rising determining section 123, the falling determining section 124, the latch circuit 125, and the dead-time generating section 126. The current adding section 127 adds up the circuit current Is1 and the load current Is2 (a current adding section in claims). The current adding section 127 gives a circuit current value Is1+Is2, which is an addition result, to the rising determining section 123 and the falling determining section 124 as the circuit current Is.

The operations of the current-target-value determining section 121, the envelope generating section 122, the rising determining section 123, the falling determining section 124, the latch circuit 125, and the dead-time generating section 126 are the same as the operations in the second embodiment. Therefore, in the third embodiment, action and effects same as the action and effects in the second embodiment can be attained.

The circuit-current detecting section includes a first circuit-current detecting section that detects the circuit current Is1 flowing through the first series circuit 111 and a second circuit-current detecting section that detects the circuit current (the load current) Is2 flowing through the second series circuit 112. The controller 12-3 includes a current adding section that adds up the circuit current Is1 detected by the first circuit-current detecting section and the circuit current (the load current) Is2 detected by the second circuit-current detecting section.

Incidentally, in the second embodiment, the dead-time generating section 126 is added to the controller 12-1 in the first embodiment. Therefore, it goes without saying that the configuration in the third embodiment can be directly applied to the power converting apparatus 1-1 in the first embodiment.

Fourth Embodiment

A fourth embodiment is explained. Note that, in the fourth embodiment, components same as the components in the second embodiment are denoted by the same reference numerals and signs and detailed explanation of the components is omitted.

Figure 10:
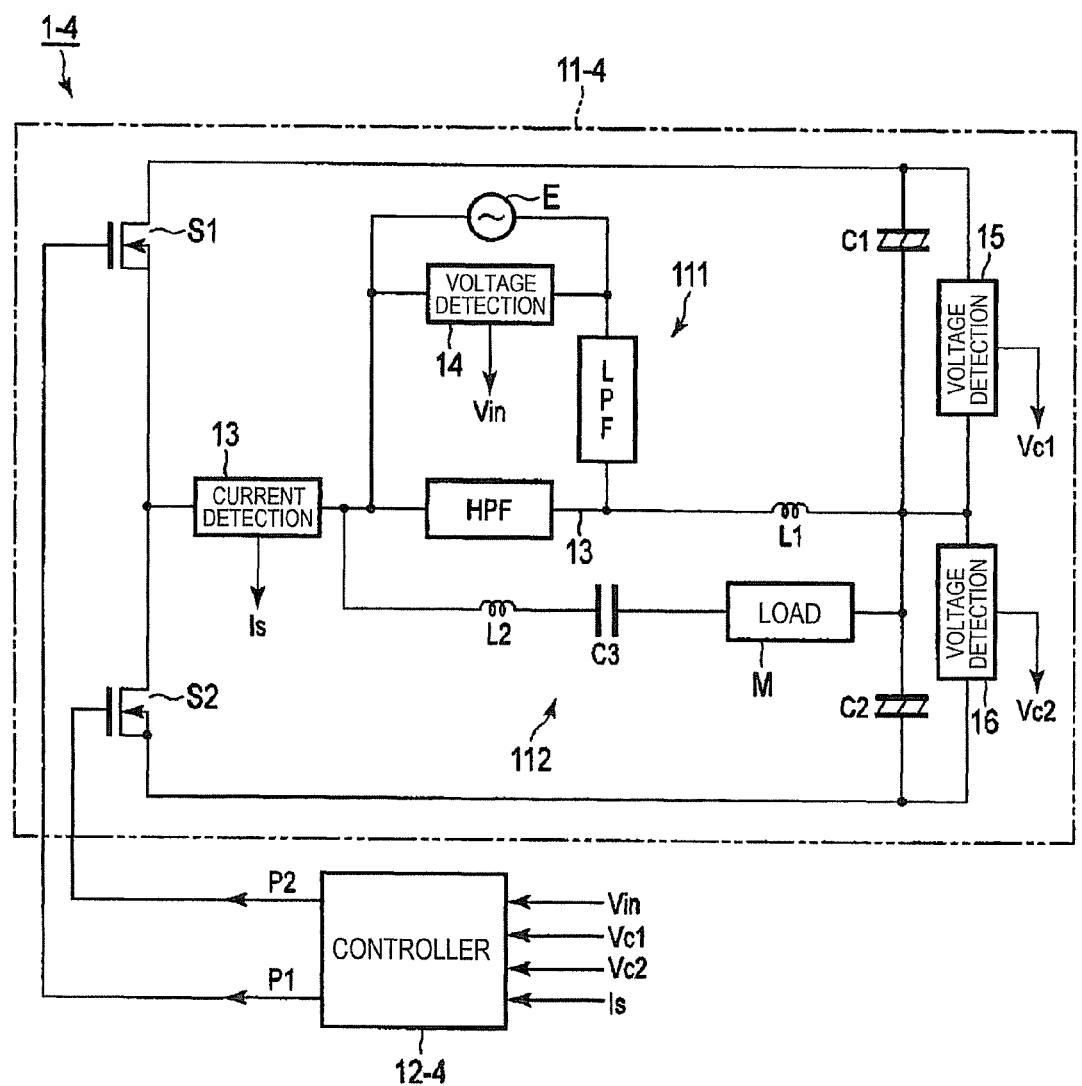
FIG. 10 is a circuit configuration diagram of a power converting apparatus in a fourth embodiment.

FIG. 10 is a circuit configuration diagram of a power converting apparatus 1-4 in the fourth embodiment. The power converting apparatus 1-4 includes a power conversion circuit 11-4 and a controller 12-4 for the power conversion circuit 11-4. In the power conversion circuit 11-4, a first capacitive-voltage detecting unit 15 and a second capacitive-voltage detecting unit 16 are added to the power conversion circuit 11-2 in the second embodiment.

The first capacitive-voltage detecting unit 15 detects a potential difference between both ends of the first capacitor C1 as a capacitive voltage Vc1 (a first capacitive-voltage detecting section in claims). The second capacitive-voltage detecting unit 16 detects a potential difference between both ends of the second capacitor C2 as a capacitive voltage Vc2 (a second capacitive-voltage detecting section in claims). The first and second capacitive voltage detecting units 15 and 16 respectively give the detected capacitive voltages Vc1 and Vc2 to the controller 12-4.

The controller 12-4 generates the first and second pulse signals P1 and P2 on the basis of the circuit current Is and the power supply voltage Vin and the capacitive voltages Vc1 and Vc2. The controller 12-4 supplies the first pulse signal P1 to the first switch S1 and supplies the second pulse signal P2 to the second switch S2.

Figure 11:
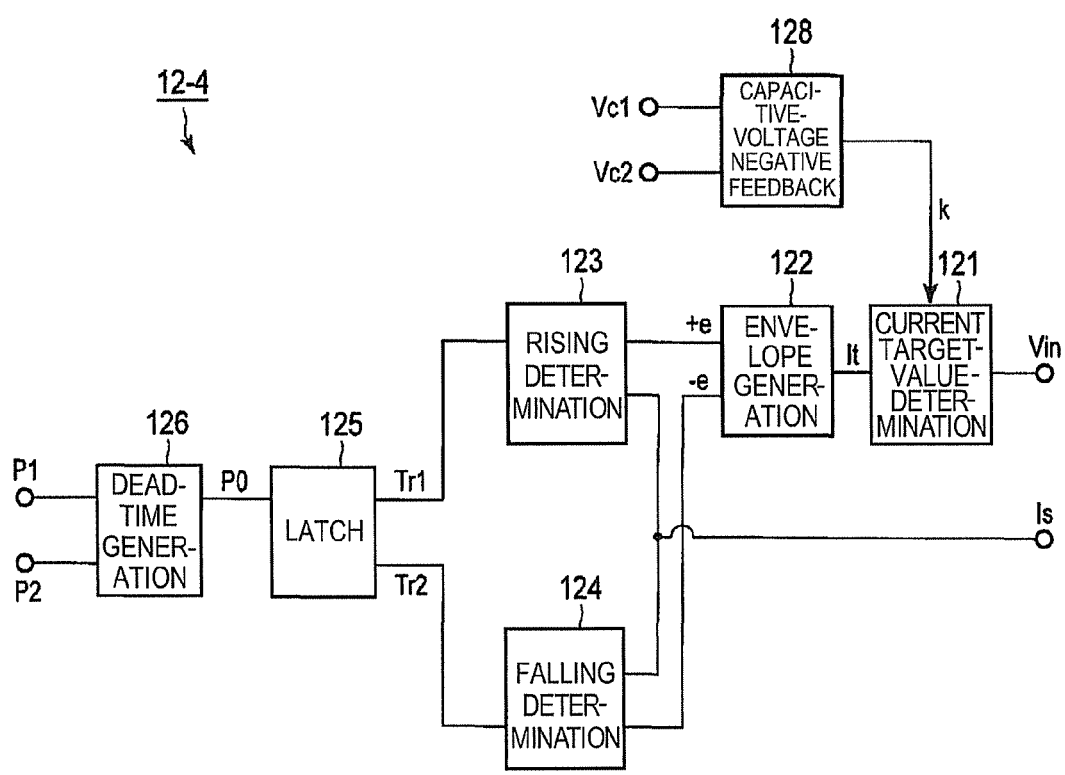
FIG. 11 is a block diagram showing a specific configuration of a controller in the fourth embodiment.

FIG. 11 is a block diagram showing a specific configuration of the controller 12-4. The controller 12-4 includes a capacitive-voltage negative feedback section 128 in addition to the current-target-value determining section 121, the envelope generating section 122, the rising determining section 123, the falling determining section 124, the latch circuit 125, and the dead-time generating section 126.

The capacitive-voltage negative feedback section 128 sets the coefficient k used in the current-target-value determining section 121. That is, the capacitive-voltage negative feedback section 128 receives, as an input, the capacitive voltage Vc1 of the first capacitor C1 detected by the first capacitive-voltage detecting unit 15 and the capacitive voltage Vc2 of the second capacitor C2 detected by the second capacitive-voltage detecting unit 16. The capacitive-voltage negative feedback section 128 determines whether a total capacitive voltage Vc1+Vc2 obtained by adding up the capacitive voltage Vc1 and the capacitive voltage Vc2 is higher or lower than a first threshold SH1. If the total capacitive voltage Vc1+Vc2 is higher than the first threshold SH1, the capacitive-voltage negative feedback section 128 sets the coefficient k to a first value k1. On the other hand, if the total capacitive voltage Vc1+Vc2 is lower than a second threshold SH2 (<SH1), the capacitive-voltage negative feedback section 128 sets the coefficient k to a second value k2 smaller than the first value k1 (a capacitive-voltage negative feedback section in claims).

The current-target-value determining section 121 receives, as an input, a signal of the power supply voltage Vin detected by the power-supply-voltage detecting unit 14, multiplies the signal with the coefficient k (k1 or k2), and determines the target current value It. The operations of the envelope generating section 122, the rising determining section 123, the falling determining section 124, the latch circuit 125, and the dead-time generating section 126 are the same as the operations in the second embodiment.

Figure 12:
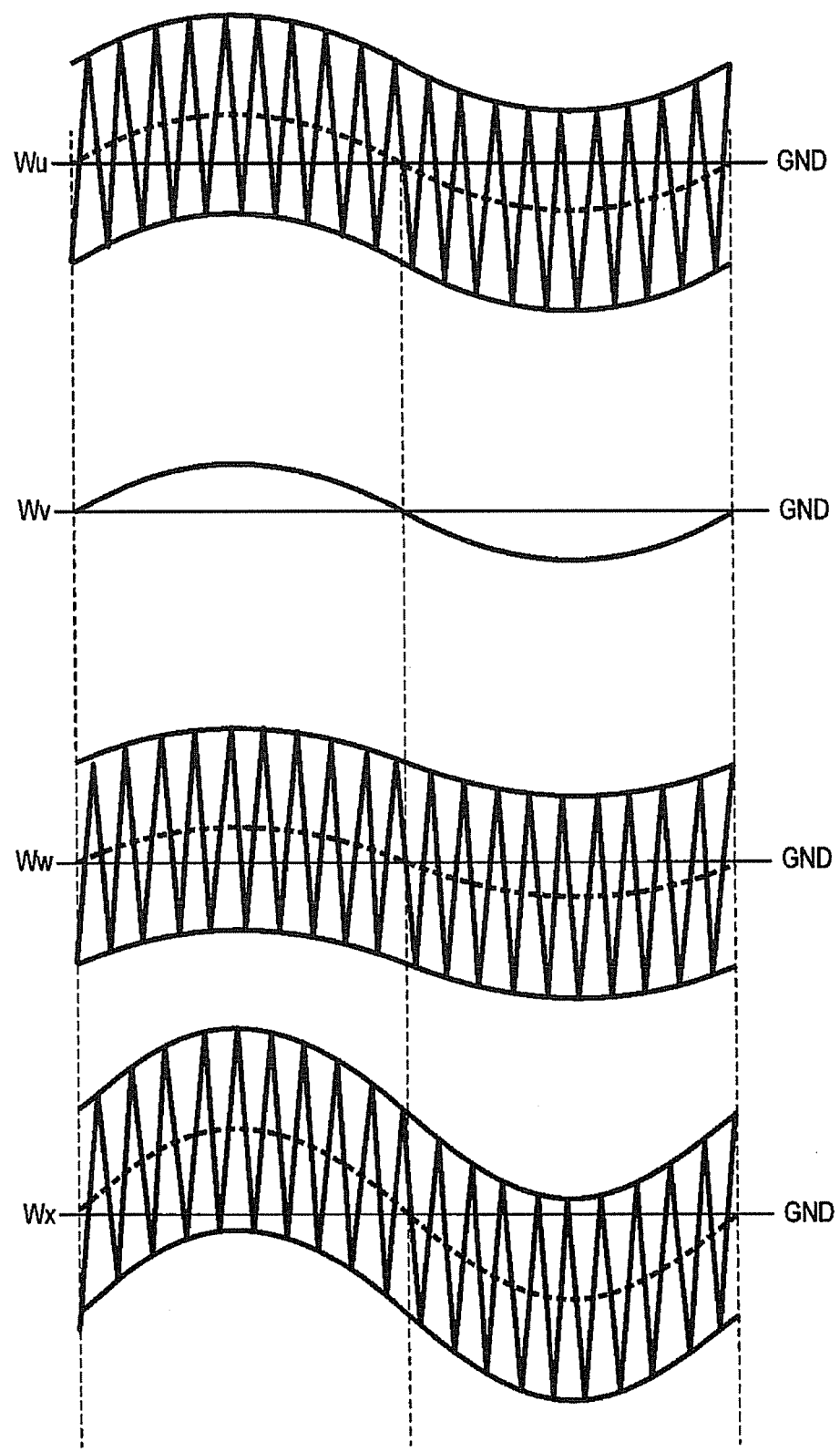
FIG. 12 is a waveform chart used for explanation of the action of the power converting apparatus.

FIG. 12 is a waveform chart used for explanation of the action of the power converting apparatus 1-4. In FIG. 12, a waveform Wu indicates the circuit current Is detected by the circuit-current detecting unit 13. In the circuit current Is, a high-frequency component (100 KHz) generated by opening and closing of the first switch S1 and the second switch S2 is mixed with a low-frequency component (50 Hz) having a cycle same as the cycle of the power supply voltage Vin.

A waveform Wv indicates the circuit current Is passing through the low-pass filter LPF and flowing into the alternating-current power supply E. As shown in the figure, since the high-frequency component is removed by the low-pass filter LPF, an electric current of only the low-frequency component of 50 Hz flows to the alternating-current power supply E.

In such an operation environment, if it is desired to increase or reduce input power, since the power supply voltage Vin is common, the input current Iin only has to be increased or reduced. To increase or reduce the input current Iin, the coefficient k only has to be changed in a process for multiplying the waveform of the power supply voltage Vin showin in the first embodiment with the coefficient k to determine the target current value It. For example, if the waveform Wv is set to the target current value It and a peak of the current value It is 2.82 A, to increase the input current Iin, the coefficient k is increased to set the peak to, for example, 2.9 A. Conversely, to reduce the input current Iin, the coefficient k is reduced to set the peak to, for example, 2.7 A.

A waveform Ww is a waveform obtained when the coefficient k is small. A waviness degree of the low-frequency component of 50 Hz is small. However, since an interval between the envelopes determined by the width d is unchanged, a switching frequency of the high-frequency component (100 KHz) rising and falling between the envelopes is hardly affected. If the switching frequency does not change, power consumption in the load M driven as the inverter hardly changes. That is, output power does not change and only input power decreases. Therefore, the input power and the output power change to a relation of the input power<the output power. Then, charges of the first capacitor C1 and the second capacitor C2 are consumed. That is, the total capacitive voltage Vc1+Vc2 decreases.

Therefore, the capacitive-voltage negative feedback section 128 sets the coefficient k to the first value k1 if the total capacitive voltage Vc1+Vc2 is lower than the second threshold SH2. As a result, since the waviness degree of the target current value It increases, the input current Iin increases.

A waveform Wx is a waveform obtained when the coefficient k is large. A waviness degree of the low-frequency component of 50 Hz is large. However, since an interval between the envelopes determined by the width d is unchanged, a switching frequency of the high-frequency component (100 KHz) rising and falling between the envelopes is hardly affected. If the switching frequency does not change, power consumption in the load M driven as the inverter hardly changes. That is, output power does not change and only input power increases. Therefore, the input power and the output power change to a relation of the input power>the output power soon. Then, charges of the first capacitor C1 and the second capacitor C2 are accumulated. That is, the total capacitive voltage Vc1+Vc2 increases.

If the total capacitive voltage Vc1+Vc2 is higher than the first threshold SH1 (SH1>SH2), the capacitive-voltage negative feedback section 128 sets the coefficient k to the second value k2 (k2<k1). As a result, since a waviness degree of the target current value It decreases. Therefore, the input current Iin decreases.

As explained above, the total capacitive voltage Vc1+Vc2 obtained by adding up the capacitive voltage Vc1 of the first capacitor C1 and the capacitive voltage Vc2 of the second capacitor C2 fluctuates according to a balance relation between input power and output power, that is, a balance relation with power consumption in the load M. Usually, since the impedance of the load M changes, the power consumption fluctuates at any time. The total capacitive voltage Vc1+Vc2 also fluctuates following the fluctuation.

In the fourth embodiment, the total capacitive voltage Vc1+Vc2 is negatively fed back to the coefficient k in determining a target value of the circuit current Is. Specifically, if the total capacitive voltage Vc1+Vc2 is high, the coefficient k is reduced and a target value of the circuit current Is is reduced. Conversely, if the total capacitive voltage Vc1+Vc2 is low, the coefficient k is increased and the target value of the circuit current Is is increased. Consequently, it is possible to stably maintain the total capacitive voltage Vc1+Vc2 even if the impedance of the load M changes.

As explained above, according to the fourth embodiment, it is possible to control only the input power separately from the output power (the power consumption of the load M). Therefore, it is possible to provide the power converting apparatus 1-4 that is simple in configuration but excellent in controllability. The simple configuration and the easiness in control are industrially very beneficial.

Note that, in the fourth embodiment, the relation between the first threshold value SH1 and the second threshold value SH2 is set as SH1>SH2. However, the relation may be set as SH1=SH2.

Incidentally, in the second embodiment, the dead-time generating section 126 is added to the controller 12-1 in the first embodiment. In the third embodiment, the current detecting unit 13 of the power conversion circuit 11-2 in the second embodiment is divided into the first and second current detecting units 13a and 13b and the current adding section 127 is added to the controller 12-2. Therefore, it goes without saying that the configuration in the fourth embodiment can be directly applied to the power converting apparatus 1-1 in the first embodiment or the power converting apparatus 1-3 in the third embodiment.

Fifth Embodiment

A fifth embodiment is explained. In the fourth embodiment, the input power is controlled separately from the output power (the power consumption of the load M). In the fifth embodiment, an electric current flowing through the load M is controlled according to the magnitude of the circuit current Is. Note that, in the fifth embodiment, components same as the components in the fourth embodiment are denoted by the same reference numerals and signs and detailed explanation of the components is omitted.

A power converting apparatus 1-5 in the fifth embodiment includes a power conversion circuit 11-5 and a controller 12-5 for the power conversion circuit 11-5. The power conversion circuit 11-5 includes a configuration same as the configuration of the power conversion circuit 11-4 in the fourth embodiment.

Figure 13:
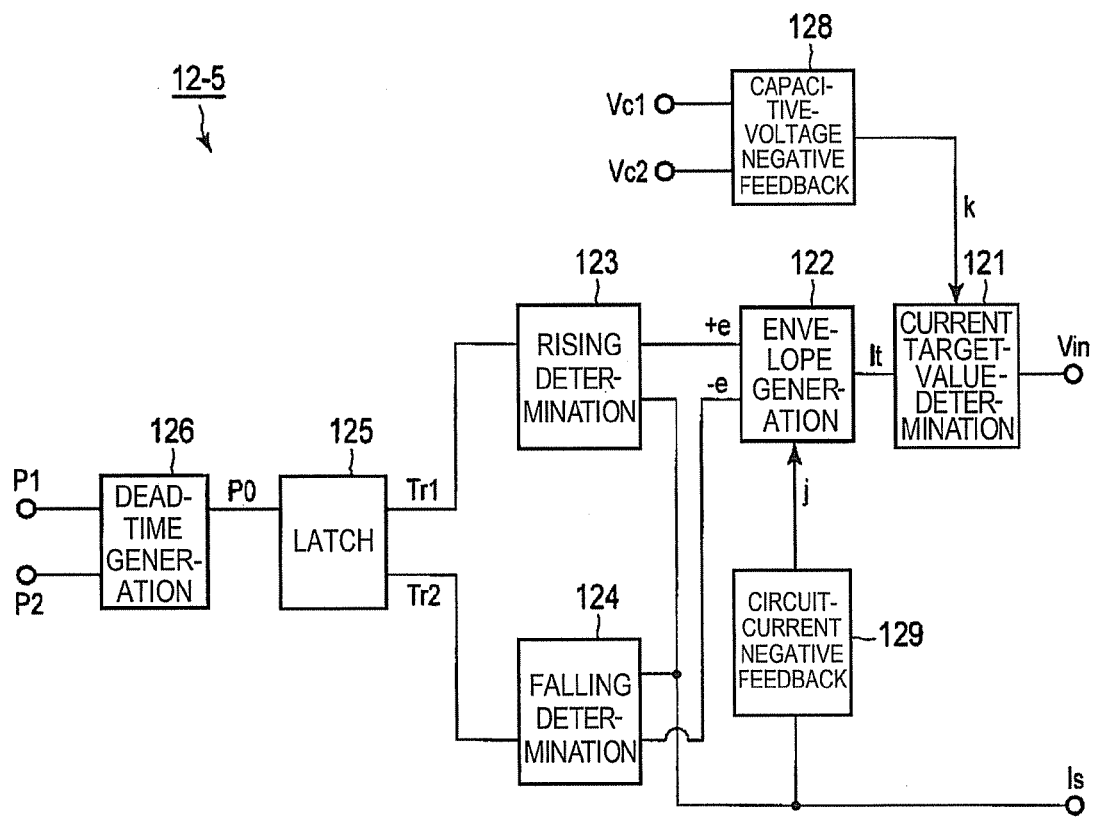
FIG. 13 is a block diagram showing a specific configuration of a controller in a fifth embodiment.

FIG. 13 is a block diagram showing a specific configuration of the controller 12-5. The controller 12-5 includes a circuit-current negative feedback section 129 in addition to the current-target-value determining section 121, the envelope generating section 122, the rising determining section 123, the falling determining section 124, the latch circuit 125, the dead-time generating section 126, and the capacitive-voltage negative feedback section 128.

The circuit-current negative feedback section 129 receives the circuit current Is as an input. If the circuit current Is is larger than a third threshold SH3, the circuit-current negative feedback section 129 sets a coefficient j to a value j1 smaller than "1". On the other hand, if the circuit current Is is smaller than a fourth threshold SH4 (<SH3), the circuit-current negative feedback section 129 sets the coefficient j to a value j2 larger than "1". The circuit-current negative feedback section 129 gives the coefficient j to the envelope generating section 122 (a circuit-current negative feedback section in claims).

The envelope generating section 122 multiplies the width d set in advance with the coefficient j to calculate a product jd. The envelope generating section 122 adds the product jd to a signal equivalent to the target current value It to generate the positive envelope +e. The envelope generating section 122 subtracts the product jd from the signal equivalent to the current value It to generate the negative envelope −e. The envelope generating section 122 supplies a signal equivalent to the positive envelope +e to the first input terminal of the rising determining section 123 and supplies a signal equivalent to the negative envelope −e to the first input terminal of the falling determining section 124.

The operations of the rising determining section 123, the falling determining section 124, the latch circuit 125, and the dead-time generating section 126 are the same as the operations in the fourth embodiment.

Figure 14:
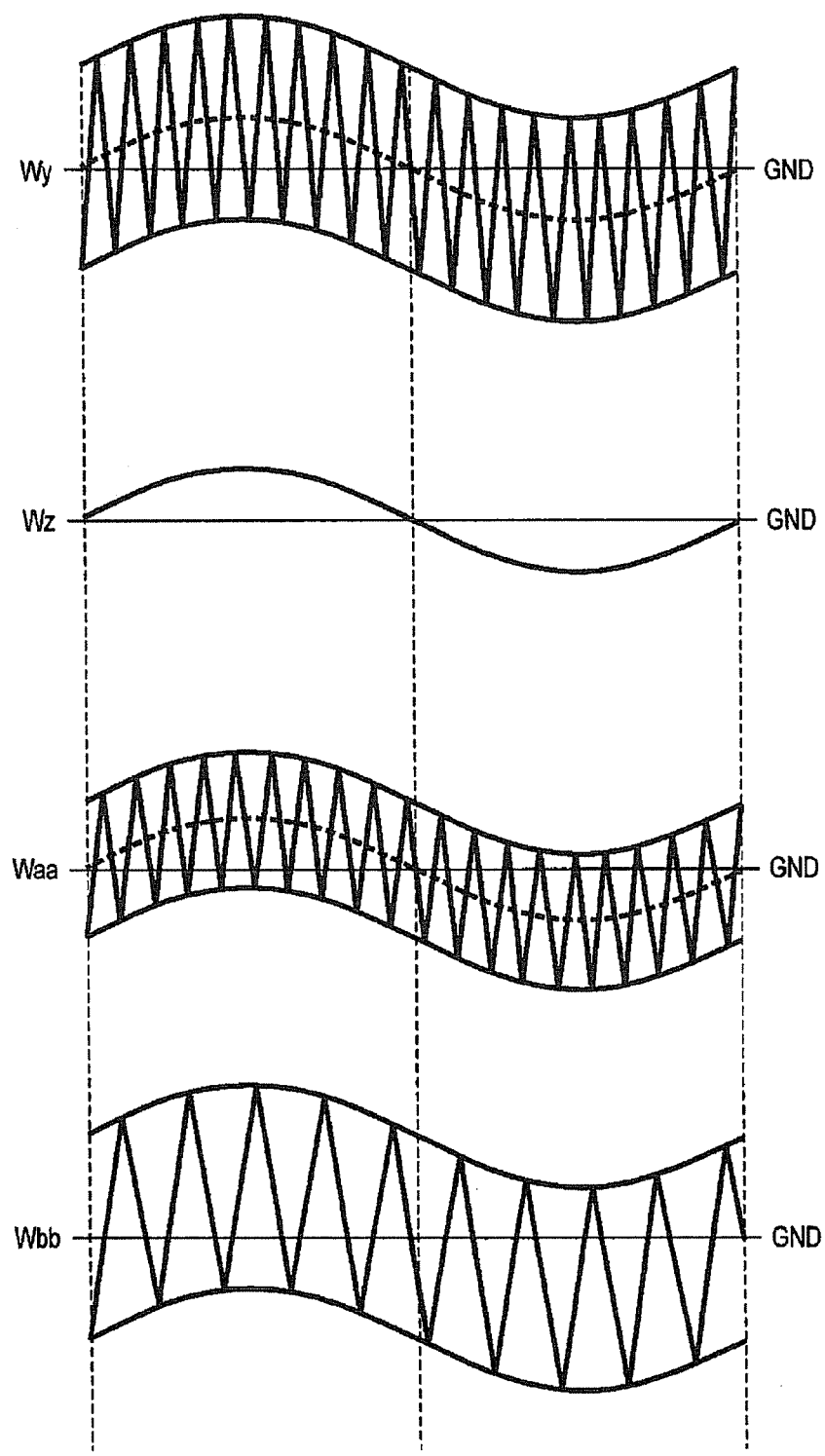
FIG. 14 is a waveform chart used for explanation of the action of a power converting apparatus in the fifth embodiment.

FIG. 14 is a waveform chart for explaining the action of the power converting apparatus 1-5. In FIG. 14, a waveform Wy indicates the circuit current Is detected by the circuit current detecting unit 13. In the circuit current Is, a high-frequency component (100 KHz) generated by opening and closing of the first switch S1 and the second switch S2 is mixed with a low-frequency component (50 Hz) having a cycle equal to the cycle of a power supply voltage.

A waveform Wz indicates the circuit current Is passing through the low-pass filter LPF and flowing into the alternating-current power supply E. Since the high-frequency component is removed by the low-pass filter LPF, an electric current of only the low-frequency component of 50 Hz flows to the alternating-current power supply E.

In such an operation environment, if it is desired to reduce an electric current supplied to the load M because the circuit current Is increases, the circuit-current negative feedback section 129 sets the coefficient j to the value j1 smaller than "1". Then, as indicated by a waveform Waa, an interval between the positive envelope +e and the negative envelope −e decreases. If the interval between the envelopes decreases, since control is performed such that the circuit current Is rises and falls within the interval, the circuit current Is decreases. At the same time, the frequency of the high-frequency component mixed in the circuit current Is rises. Therefore, the electric current supplied to the load M decreases.

Conversely, if it is desired to increase the electric current supplied to the load M because the circuit current Is decreases, the circuit-current negative feedback section 129 sets the coefficient j to the value j2 larger than "1". Then, as indicated by a waveform Wbb, the interval between the positive envelope +e and the negative envelope −e increases. If the interval between the envelopes increases, the circuit current Is increases. At the same time, the frequency of the high-frequency component mixed in the circuit current Is decreases. Consequently, the load current Is2 increases.

On the other hand, the electric current passing through the low-pass filter LPF and flowing into the alternating-current power supply E changes according to a waveform of the center line between the positive envelope +e and the negative envelope −e. Therefore, irrespective of how the interval between the envelopes changes because the width d is multiplied with the coefficient j, a waviness degree of the electric current flowing into the alternating-current power supply E does not change. This means that the input power does not change either.

As explained above, according to the fifth embodiment, it is possible to control the electric current flowing through the load M on the basis of the circuit current Is flowing into the alternating-current power supply E. Therefore, it is possible to provide the power converting apparatus 1-5 that is simple in configuration but excellent in controllability for the load M. The simple configuration and the easiness in control are industrially very beneficial.

Note that, in the fifth embodiment, the relation between the third threshold value SH3 and the fourth threshold value SH4 is set as SH3>SH4. However, the relation may be set as SH3=SH4.

In the fifth embodiment, the circuit-current negative feedback section 129 is provided in the controller 12-4 in the fourth embodiment. It goes without saying that the action and effects explained in the fifth embodiment are attained even if the circuit-current negative feedback section 129 is provided in the controllers 12-1 to 12-3 in the first to third embodiments.

Sixth Embodiment

A sixth embodiment is explained. In the fifth embodiment, the coefficient j is determined according to the magnitude of the circuit current Is to adjust the interval between the positive and negative envelopes +e and −e. In the sixth embodiment, an electric current supplied to the load M, a so-called load current Is2 is detected, and the coefficient j is determined according to the magnitude of the load current Is2 to adjust the interval between the positive and negative envelopes +e and −e.

Figure 15:
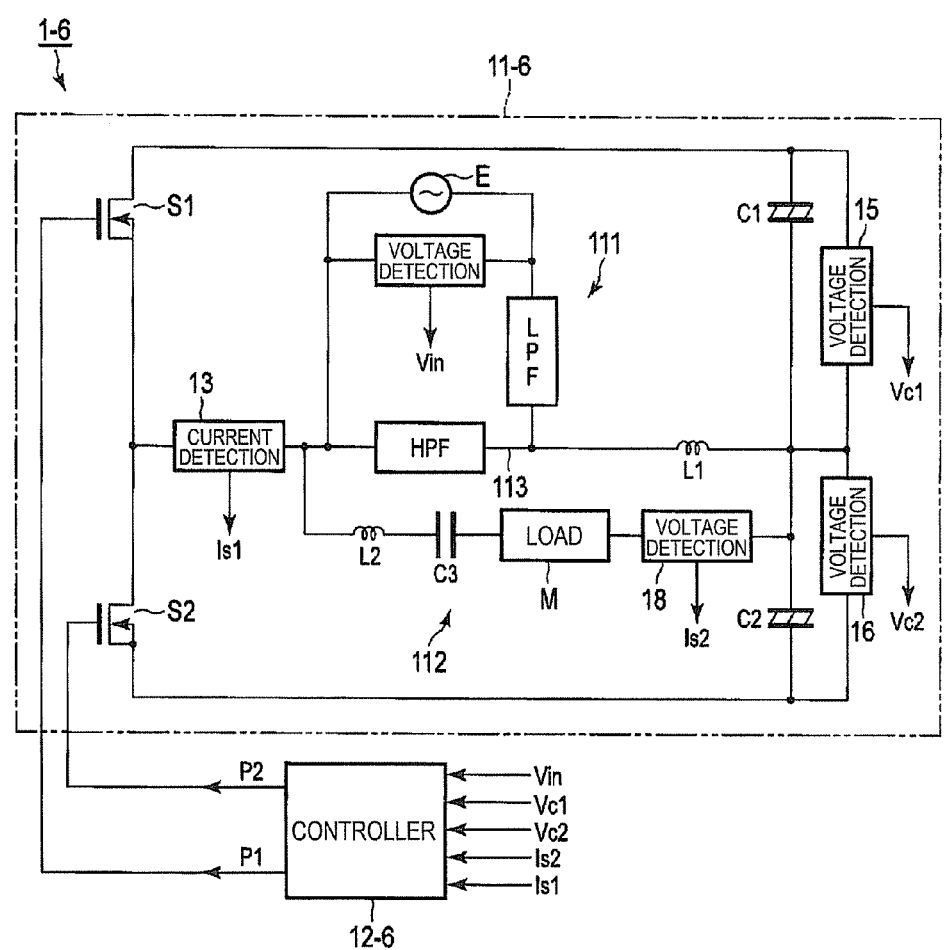
FIG. 15 is a circuit configuration diagram of a power converting apparatus in a sixth embodiment.

FIG. 15 is a circuit configuration diagram of a power converting apparatus 1-6 in the sixth embodiment. The power converting apparatus 1-6 includes a power conversion circuit 11-6 and a controller 12-6 for the power conversion circuit 11-6. In the power conversion circuit 11-6, a load-current detecting unit 18 is added to the power conversion circuit 11-4 in the fourth embodiment. The load-current detecting unit 18 detects the load current Is2 (a load-current detecting section in claims). The load-current detecting unit 18 gives the detected load current Is2 to the controller 12-6.

The controller 12-6 generates the first and second pulse signals P1 and P2 on the basis of the load current Is2 and the power supply voltage Vin and the capacitive voltages Vc1 and Vc2. The controller 12-6 supplies the first pulse signal P1 to the first switch S1 and supplies the second pulse signal P2 to the second switch S2.

Figure 16:
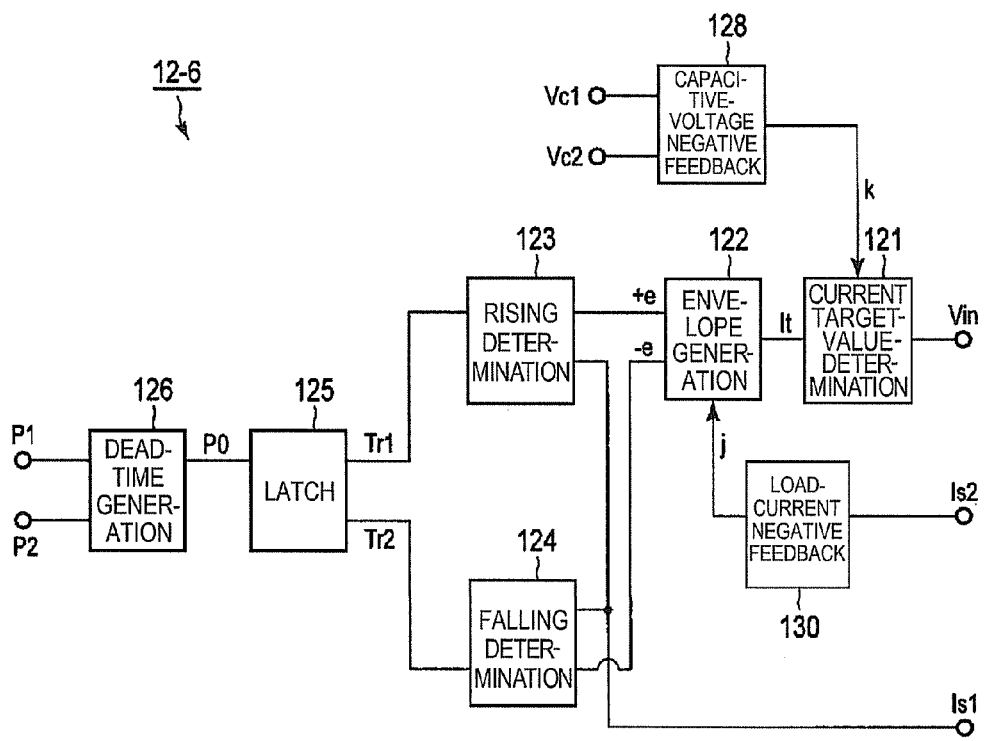
FIG. 16 is a block diagram showing a specific configuration of a controller in the sixth embodiment.

FIG. 16 is a block diagram showing a specific configuration of the controller 12-6. The controller 12-6 includes a load-current negative feedback section 130 in addition to the current-target-value determining section 121, the envelope generating section 122, the rising determining section 123, the falling determining section 124, the latch circuit 125, the dead-time generating section 126, and the capacitive-voltage negative feedback section 128.

The load-current negative feedback section 130 receives the load current Is2 as an input. If the load current Is2 is larger than a fifth threshold SH5, the load-current negative feedback section 130 sets the coefficient j to the value j1 smaller than "1". On the other hand, if the load current Is2 is smaller than a sixth threshold SH6 (<SH5), the load-current negative feedback section 130 sets the coefficient j to the value j2 larger than "1". The load-current negative feedback section 130 gives the coefficient j to the envelope generating section 122 (a load-current negative feedback section in claims).

The envelope generating section 122 multiplies the width d set in advance with the coefficient j to calculate the product jd.

The envelope generating section 122 adds the product jd to a signal equivalent to the target current value It to generate the positive envelope +e. The envelope generating section 122 subtracts the product jd from the signal equivalent to the current value It to generate the negative envelope −e. The envelope generating section 122 supplies a signal equivalent to the positive envelope +e to the first input terminal of the rising determining section 123 and supplies a signal equivalent to the negative envelope −e to the first input terminal of the falling determining section 124.

The operations of the rising determining section 123, the falling determining section 124, the latch circuit 125, and the dead-time generating section 126 are the same as the operations in the fourth embodiment.

According to the sixth embodiment including such a configuration, it is possible to control the load current Is2 separately from a circuit current flowing into the alternating-current power supply E. Therefore, it is possible to provide the power converting apparatus 1-6 that is simple in configuration but excellent in controllability for the load M.

Note that, in the sixth embodiment, the relation between the fifth threshold value SH5 and the sixth threshold value SH6 is set as SH5>SH6. However, the relation may be set as SH5=SH6.

Seventh Embodiment

A seventh embodiment is explained. In the sixth embodiment, the load current Is2 is controlled in the power converting apparatus 1-4 including the power conversion circuit 11-4 in the fourth embodiment. In the seventh embodiment, the load current Is2 is controlled in the power converting apparatus 1-3 including the power conversion circuit 11-3 in the third embodiment.

Figure 17:
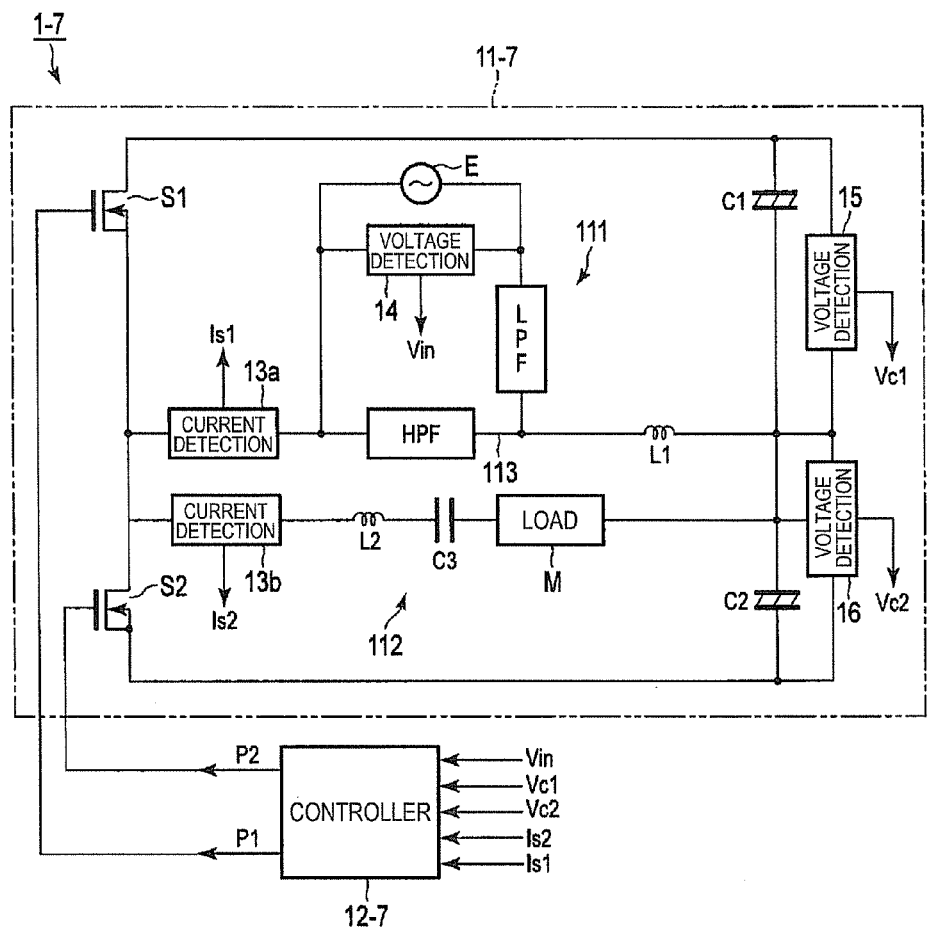
FIG. 17 is a circuit configuration diagram of a power converting apparatus in a seventh embodiment.

FIG. 17 is a circuit configuration diagram of a power converting apparatus 1-7 in the seventh embodiment. The power converting apparatus 1-7 includes a power conversion circuit 11-7 and a controller 12-7 for the power conversion circuit 11-7. In the power conversion circuit 11-7, the first capacitive-voltage detecting unit 15 and the second capacitive-voltage detecting unit 16 are added to the power conversion circuit 11-3 in the third embodiment.

The first capacitive-voltage detecting unit 15 detects a potential difference between both ends of the first capacitor C1 as the capacitive voltage Vc1 (the first capacitive-voltage detecting section in claims). The second capacitive-voltage detecting unit 16 detects a potential difference between both ends of the second capacitor C2 as the capacitive voltage Vc2 (the second capacitive-voltage detecting section in claims). The first and second capacitive voltage detecting units 15 and 16 respectively give the detected capacitive voltages Vc1 and Vc2 to the controller 12-7.

The controller 12-7 generates the first and second pulse signals P1 and P2 on the basis of the circuit current Is1 and the load current Is2 and the power supply voltage Vin and the capacitive voltages Vc1 and Vc2. The controller 12-7 supplies the first pulse signal P1 to the first switch S1 and supplies the second pulse signal P2 to the second switch S2.

Figure 18:
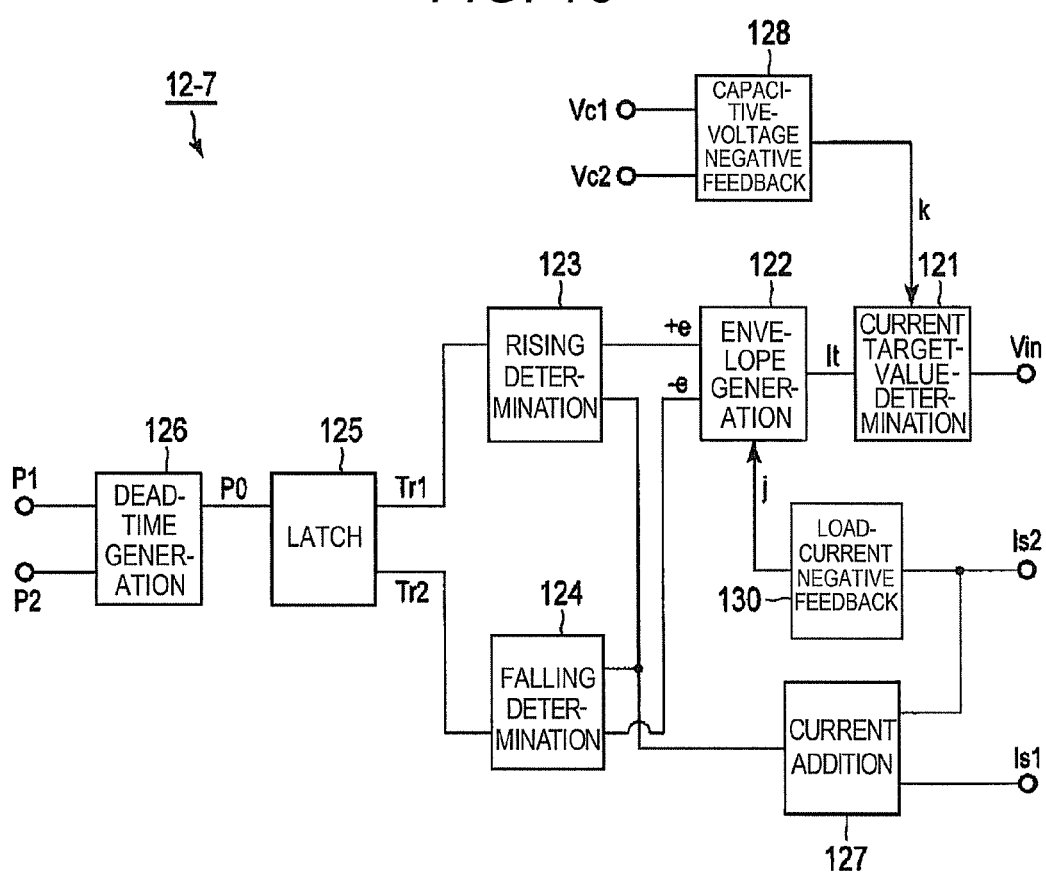
FIG. 18 is a block diagram showing a specific configuration of a controller in the seventh embodiment.

FIG. 18 is a block diagram showing a specific configuration of the controller 12-7. The controller 12-7 includes the capacitive-voltage negative feedback section 128 and the load-current negative feedback section 130 in addition to the current-target-value determining section 121, the envelope generating section 122, the rising determining section 123, the falling determining section 124, the latch circuit 125, the dead-time generating section 126, and the current adding section 127.

The capacitive-voltage negative feedback section 128 determines the coefficient k used in the current-target-value determining section 121 on the basis of a relation between the total capacitive voltage Vc1+Vc2 obtained by adding up the capacitive voltage Vc1 and the capacitive voltage Vc2 and the first threshold value SH1 or the second threshold value SH2.

The load-current negative feedback section 130 determines the coefficient j used in the envelope generating section 122 on the basis of a relation between the load current Is2 and the fifth threshold SH5 or the sixth threshold SH6.

The operations of the current-target-value determining section 121, the envelope generating section 122, the rising determining section 123, the falling determining section 124, the latch circuit 125, the dead-time generating section 126, and the current adding section 127 are the same as the operations in the third embodiment.

In the seventh embodiment including such a configuration, it is possible to control the load current Is2 separately from a circuit current flowing into the alternating-current power supply E. Therefore, it is possible to provide the power converting apparatus 1-7 that is simple in configuration but excellent in controllability for the load M.

Eighth Embodiment

An eighth embodiment is explained. In the fifth to seventh embodiments, the load current Is2 is controlled. In the eighth embodiment, a voltage applied to the load M is controlled to be fixed. Such control is generally called voltage supply-type inverter control. Note that, in the eighth embodiment, components same as the components in the fourth embodiment are denoted by the same reference numerals and signs and detailed explanation of the components is omitted.

Figure 19:
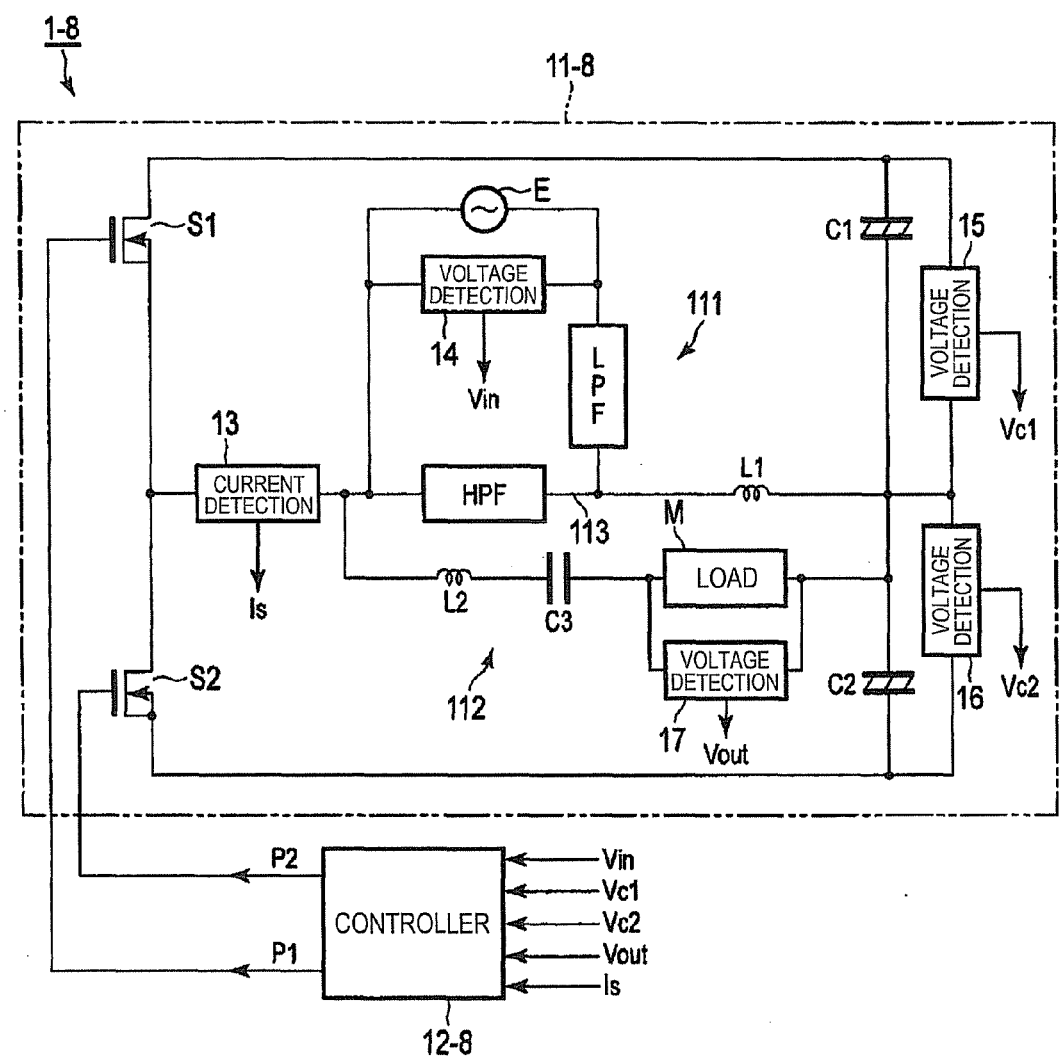
FIG. 19 is a circuit configuration diagram of a power converting apparatus in an eighth embodiment.

FIG. 19 is a circuit configuration diagram of a power converting apparatus 1-8 in the eighth embodiment. The power converting apparatus 1-8 includes a power conversion circuit 11-8 and a controller 12-8 for the power conversion circuit 11-8. In the power conversion circuit 11-8, a load-voltage detecting unit 17 is added to the power conversion circuit 11-4 in the fourth embodiment. The load-voltage detecting unit 17 detects a potential difference between both ends of the load M as a load voltage Vout (a load-voltage detecting section in claims). The load-voltage detecting unit 17 gives the detected load voltage Vout to the controller 12-8.

The controller 12-8 generates the first and second pulse signals P1 and P2 on the basis of the circuit current Is, the power supply voltage Vin, the capacitive voltages Vc1 and Vc2, and the load voltage Vout. The controller 12-8 supplies the first pulse signal P1 to the first switch S1 and supplies the second pulse signal P2 to the second switch S2.

Figure 20:
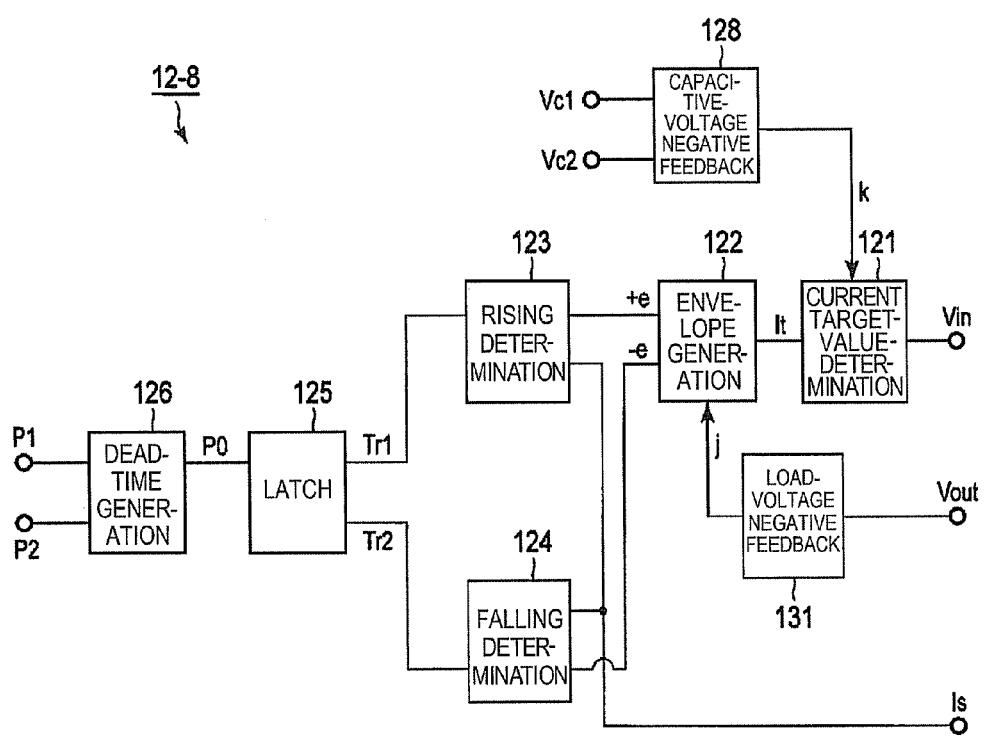
FIG. 20 is a block diagram showing a specific configuration of a controller in the eighth embodiment.

FIG. 20 is a block diagram showing a specific configuration of the controller 12-8. The controller 12-8 includes a load-voltage negative feedback section 131 in addition to the current-target-value determining section 121, the envelope generating section 122, the rising determining section 123, the falling determining section 124, the latch circuit 125, the dead-time generating section 126, and the capacitive-voltage negative feedback section 128.

The load-voltage negative feedback section 131 receives the load voltage Vout as an input. Even if the circuit current Is is fixed, if the impedance of the load M changes, the load voltage Vout fluctuates. If the load voltage Vout is higher than a seventh threshold SH7, the load-voltage negative feedback section 131 sets the coefficient j to the value j1 smaller than "1". On the other hand, if the load voltage Vout is lower than an eighth threshold SH8 (<SH7), the load-voltage negative feedback section 131 sets the coefficient j to the value j2 larger than "1". The load-voltage negative feedback section 131 gives the coefficient j to the envelope generating section 122 (a load-voltage negative feedback section in claims).

The envelope generating section 122 multiplies the width d set in advance with the coefficient j to calculate the product jd. The envelope generating section 122 adds the product jd to a signal equivalent to the target current value It to generate the positive envelope +e. The envelope generating section 122 subtracts the product jd from the signal equivalent to the current value It to generate the negative envelope −e. The envelope generating section 122 supplies a signal equivalent to the positive envelope +e to the first input terminal of the rising determining section 123 and supplies a signal equivalent to the negative envelope −e to the first input terminal of the falling determining section 124.

The operations of the current-target-value determining section 121, the rising determining section 123, the falling determining section 124, and the latch circuit 125, and the dead-time generating section 126 are the same as the operations in the fourth embodiment.

The waveform chart of FIG. 14 can be directly used for explanation of the action of the power converting apparatus 1-8. That is, if it is desired to reduce a voltage applied to the load M because the load voltage Vout increases, the load-voltage negative feedback section 131 sets the coefficient j to the value j1 smaller than "1". Then, an interval between the positive envelope +e and the negative envelope −e decreases. If the interval between the envelopes decreases, the voltage applied to the load M decreases.

Conversely, if it is desired to increase the voltage applied to the load M because the load voltage Vout decreases, the load-voltage negative feedback section 131 sets the coefficient j to the value j2 larger than "1". Then, the interval between the positive envelope +e and the negative envelope −e increases. If the interval between the envelopes increases, the voltage applied to the load M increases.

On the other hand, the electric current passing through the low-pass filter LPF and flowing into the alternating-current power supply E changes according to a waveform of the center line between the positive envelope +e and the negative envelope −e. Therefore, irrespective of how the interval between the envelopes changes because the width d is multiplied with the coefficient j, a waviness degree of the electric current flowing into the alternating-current power supply E does not change. This means that the input power does not change either.

As explained above, according to the eighth embodiment, it is possible to control the voltage applied to the load M to be fixed without changing the input power. This means that, even if control is quickly performed in response to a sudden change of the load M, the control does not affect an input current waveform. That is, since two aspects of high responsiveness required for fluctuation in a load and always suppressing an input current harmonic are simultaneously satisfied, an industrial effect is large.

Note that, in the eighth embodiment, the relation between the seventh threshold SH7 and the eighth threshold SH8 is set as SH7>SH8. However, the relation may be set as SH7=SH8.

Ninth Embodiment

A ninth embodiment is explained. In the eighth embodiment, the load voltage Vout is controlled in the power converting apparatus 1-4 including the power conversion circuit 11-4 in the fourth embodiment. In the ninth embodiment, the load voltage Vout is controlled in the power converting apparatus 1-7 including the power conversion circuit 11-7 in the seventh embodiment.

Figure 21:
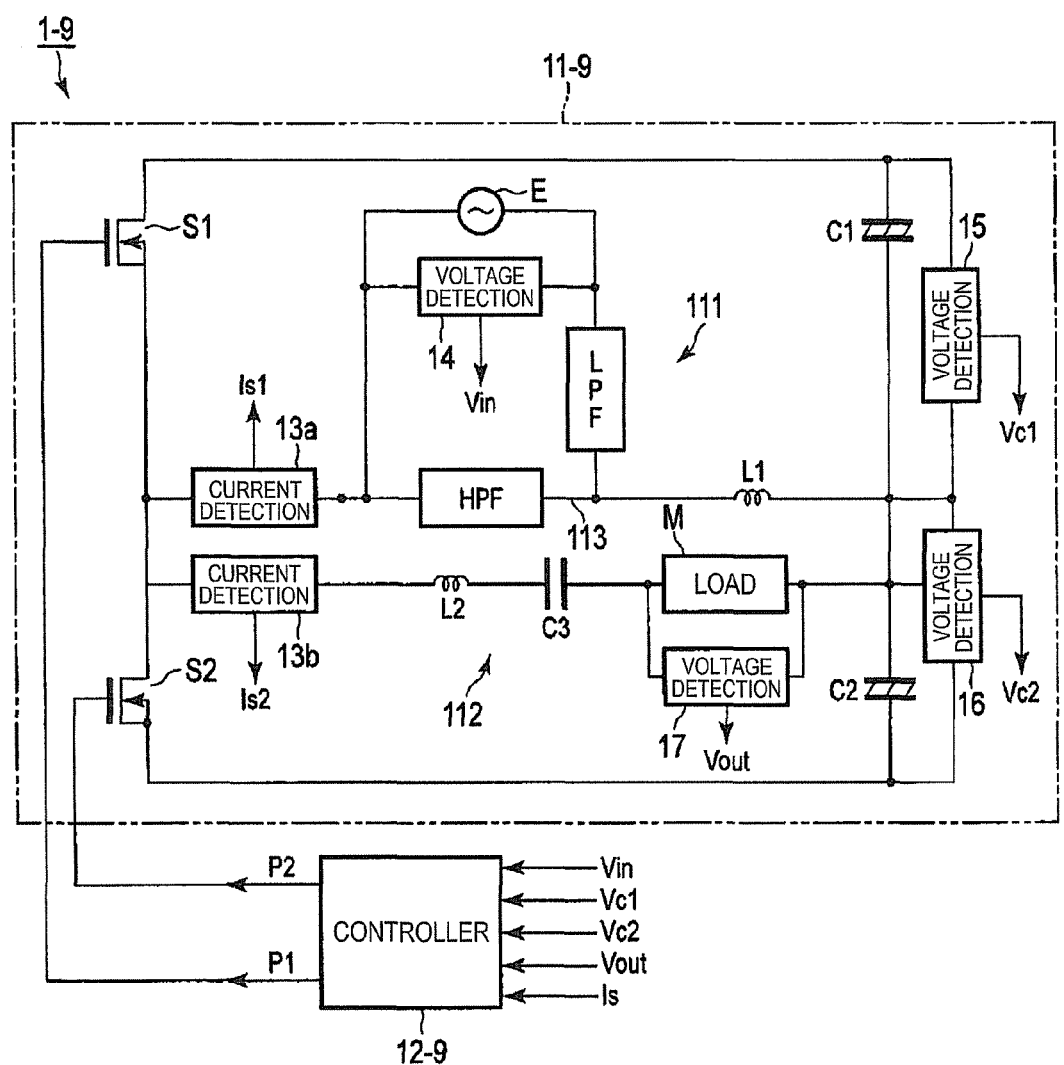
FIG. 21 is a circuit configuration diagram of a power converting apparatus in a ninth embodiment.

FIG. 21 is a circuit configuration diagram of a power converting apparatus 1-9 in the ninth embodiment. The power converting apparatus 1-9 includes a power conversion circuit 11-9 and a controller 12-9 for the power conversion circuit 11-9. In the power conversion circuit 11-9, the load-voltage detecting unit 17 is added to the power conversion circuit 11-7 in the seventh embodiment.

The first current detecting unit 13a and the second current detecting unit 13b respectively give the detected circuit current Is1 and the detected load current Is2 to the controller 12-9. The first and second capacitive-voltage detecting units 15 and 16 respectively give the detected capacitive voltages Vc1 and Vc2 to the controller 12-9. The load-voltage detecting unit 17 gives the detected load voltage Vout to the controller 12-9.

The controller 12-9 generates the first and second pulse signals P1 and P2 on the basis of the circuit current Is1 and the load current Is2, the capacitive voltages Vc1 and Vc2, and the load voltage Vout. The controller 12-9 supplies the first pulse signal P1 to the first switch S1 and supplies the second pulse signal P2 to the second switch S2.

Figure 22:
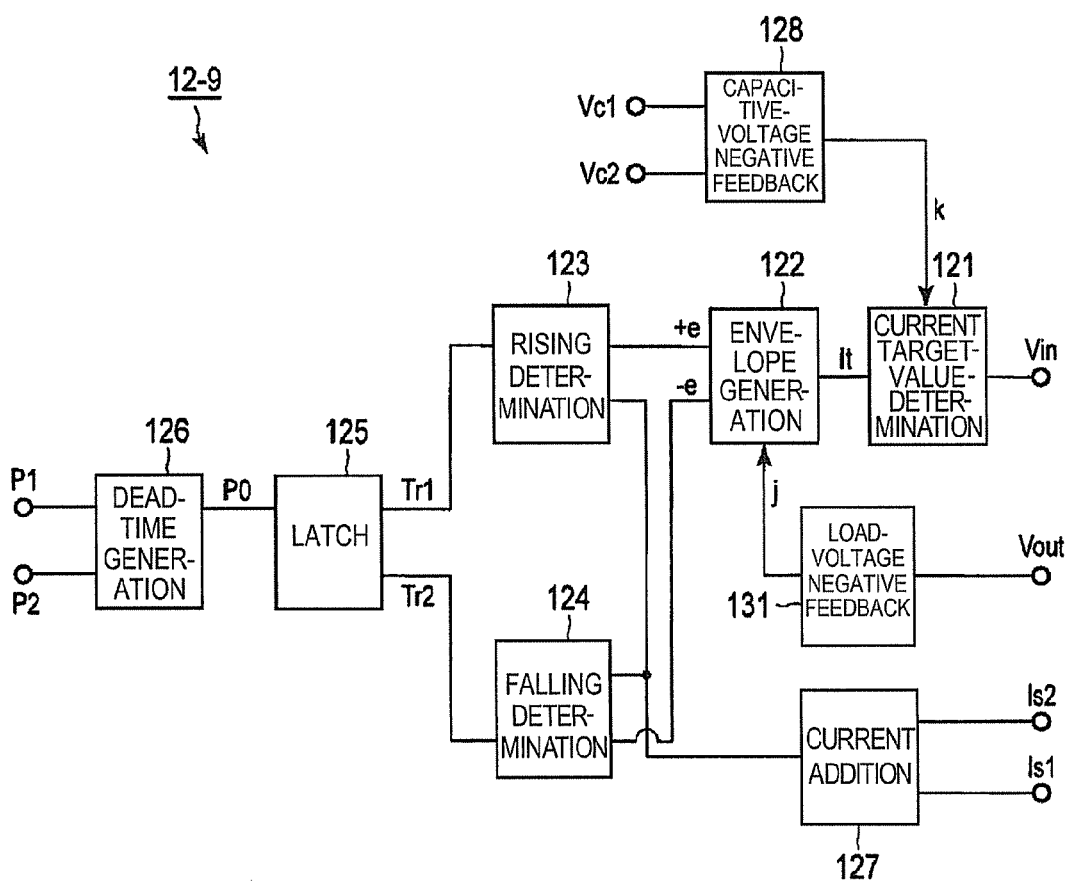
FIG. 22 is a block diagram showing a specific configuration of a controller in the ninth embodiment.

FIG. 22 is a block diagram showing a specific configuration of the controller 12-9. The controller 12-9 includes the load-voltage negative feedback section 131 in addition to the current-target-value determining section 121, the envelope generating section 122, the rising determining section 123, the falling determining section 124, the latch circuit 125, the dead-time generating section 126, the current adding section 127, and the capacitive-voltage negative feedback section 128.

The load-voltage negative feedback section 131 receives the load voltage Vout as an input. Even if the circuit current Is is fixed, if the impedance of the load M changes, the load voltage Vout fluctuates. If the load voltage Vout is higher than the seventh threshold SH7, the load-voltage negative feedback section 131 sets the coefficient j to the value j1 smaller than "1". On the other hand, if the load voltage Vout is lower than the eighth threshold SH8 (<SH7), the load-voltage negative feedback section 131 sets the coefficient j to the value j2 larger than "1". The load-voltage negative feedback section 131 gives the coefficient j to the envelope generating section 122 (the load-voltage negative feedback section in claims).

The operations of the current-target-value determining section 121, the envelope generating section 122, the rising determining section 123, the falling determining section 124, the latch circuit 125, the dead-time generating section 126, the current adding section 127, and the capacitive-voltage negative feedback section 128 are the same as the operations in the seventh embodiment. Therefore, in the ninth embodiment, action and effects same as the action and effects in the seventh embodiment can be attained.

Tenth Embodiment

In the first to ninth embodiments, during the operation of the power converting apparatuses 1-1 to 1-9, the total capacitive voltage Vc1+Vc2 obtained by adding up the capacitive voltage Vc1 of the first capacitor C1 and the capacitive voltage Vc2 of the second capacitor C2 of the power conversion circuits 11-1 to 11-9 is fixed. However, the capacitive voltage Vc1 and the capacitive voltage Vc2 sometimes gradually deviate from each other because of variation of driving of the first and second switches S1 and S2. If a degree of the deviation increases, there is a risk that one capacitor exceeds a withstand voltage, the other capacitor has no voltage, and a circuit operation is not established. However, even in that case, the total capacitive voltage Vc1+Vc2 does not change. Therefore, even if the total capacitive voltage Vc1+Vc2 is detected, the occurrence of the deviation between the capacitive voltage Vc1 and the capacitive voltage Vc2 cannot be detected. Therefore, a tenth embodiment for eliminating such a deficiency is explained.

A power converting apparatus 1-10 in the tenth embodiment includes a power conversion circuit 11-10 and a controller 12-10 for the power conversion circuit 11-10. The power conversion circuit 11-10 includes a configuration same as the configuration of the power conversion circuit 11-6 in the sixth embodiment. Therefore, explanation of the power conversion circuit 11-10 is omitted.

Figure 23:
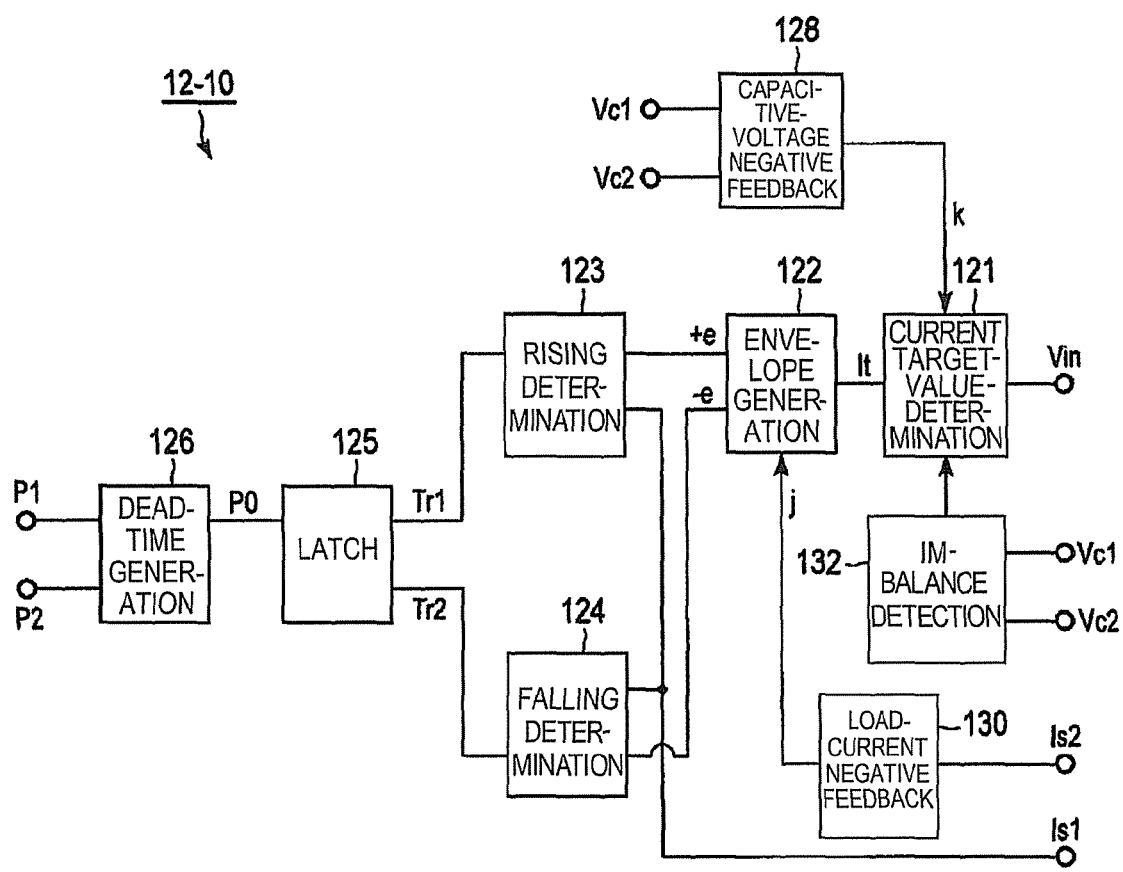
FIG. 23 is a block diagram showing a specific configuration of a controller in a tenth embodiment.

FIG. 23 is a block diagram showing a specific configuration of the controller 12-10. The controller 12-10 includes an imbalance detecting section 132 in addition to the current-target-value determining section 121, the envelope generating section 122, the rising determining section 123, the falling determining section 124, the latch circuit 125, the dead-time generating section 126, the capacitive-voltage negative feedback section 128, and the load-current negative feedback section 130.

The imbalance detecting section 132 receives, as an input, the capacitive voltage Vc1 detected by the first capacitive-voltage detecting unit 15 and the capacitive voltage Vc2 detected by the second capacitive-voltage detecting unit 16. The imbalance detecting section 132 determines whether a value Vc1−Vc2 obtained by subtracting the capacitive voltage Vc2 from the capacitive voltage Vc1 is positive or negative. If the value Vc1−Vc2 is positive, the imbalance detecting section 132 gives a positive imbalance signal (+) to the current-target-value determining section 121. On the other hand, if the value Vc1−Vc2 is negative, the imbalance detecting section 132 gives a negative imbalance signal (−) to the current-target-value determining section 121. If the value Vc1−Vc2 is "0", the imbalance detecting section 132 does not give an imbalance signal to the current-target-value determining section 121 (an imbalance detecting section in claims).

If the current-target-value determining section 121 receives the positive imbalance signal (+) from the imbalance detecting section 132, the current-target-value determining section 121 multiplies the coefficient k, which is set by the capacitive-voltage negative feedback section 128, with a predetermined coefficient h1. The coefficient h1 is a value smaller than "1" if the power supply voltage Vin is positive and is a value larger than "1" if the power supply voltage Vin is negative. The current-target-value determining section 121 multiplies a signal of the power supply voltage Vin with a coefficient kxh1 and determines the target current value It. The current-target-value determining section 121 supplies a signal equivalent to the current value It to the envelope generating section 122.

Similarly, if the current-target-value determining section 121 receives the negative imbalance signal (−) from the imbalance detecting section 132, the current-target-value determining section 121 multiplies the coefficient k, which is set by the capacitive-voltage negative feedback section 128, with a predetermined coefficient h2. The coefficient h2 is a value larger than "1" if the power supply voltage Vin is positive and is a value smaller than "1" if the power supply voltage Vin is negative. The current-target-value determining section 121 multiplies a signal of the power supply voltage Vin with a coefficient kxh2 and determines the target current value It. The current-target-value determining section 121 supplies a signal equivalent to the current value It to the envelope generating section 122.

Incidentally, if the current-target-value determining section 121 does not receive the positive or negative imbalance signal, the current-target-value determining section 121 uses the coefficient k as it is. That is, the current-target-value determining section 121 multiplies the signal of the power supply voltage Vin with the coefficient k and determines the target current value It. The current-target-value determining section 121 supplies a signal equivalent to the current value It to the envelope generating section 122.

The operations of the envelope generating section 122, the rising determining section 123, the falling determining section 124, the latch circuit 125, the dead-time generating section 126, and the load-current negative feedback section 130 are the same as the operations in the sixth embodiment.

Figure 24:
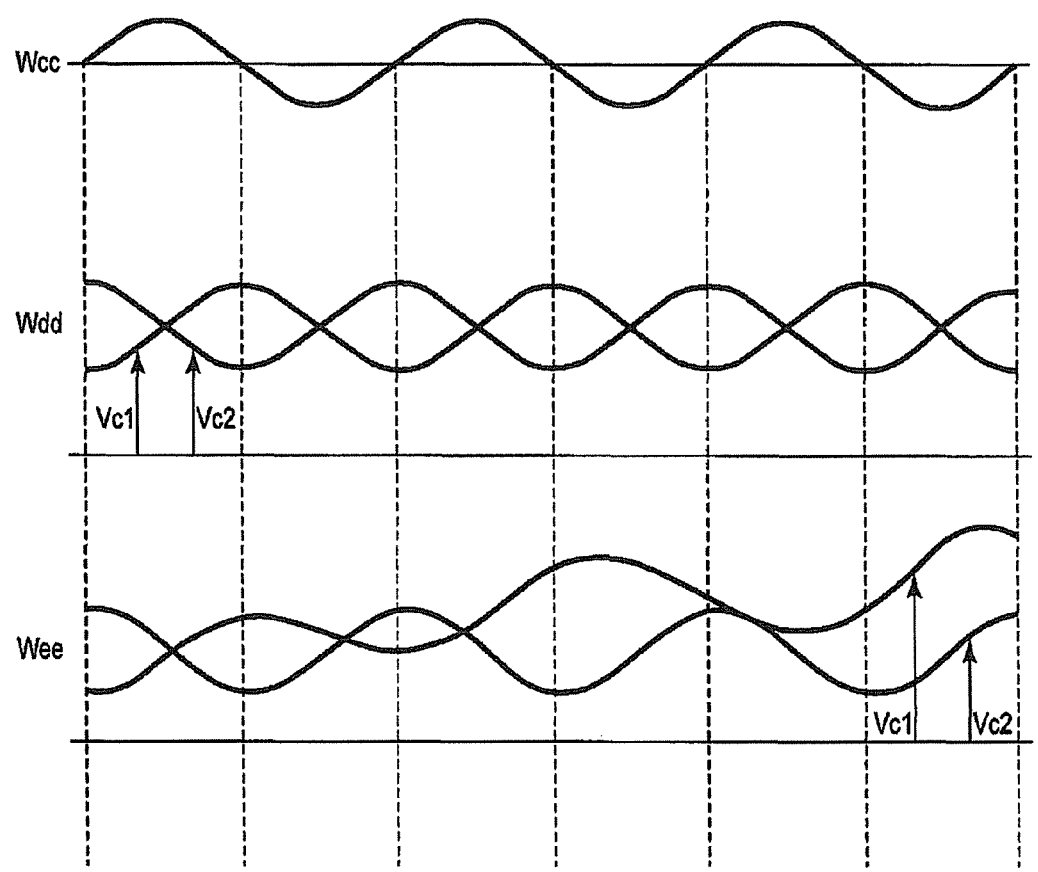
FIG. 24 is a waveform chart showing an example in which imbalance occurs between capacitive voltages of a first capacitor and a second capacitor in the tenth embodiment.

FIG. 24 is a waveform chart showing an example in which the capacitive voltage Vc1 of the first capacitor C1 and the capacitive voltage Vc2 of the second capacitor C2 lose balance. In FIG. 24, a waveform Wcc is a waveform of the power supply voltage Vin. If there is no variation in the driving of the first and second switches S1 and S2, as indicated by a waveform Wdd, the capacitive voltage Vc1 of the first capacitor C1 and the capacitive voltage Vc2 of the second capacitor C2 fluctuate with phases shifted by 180 degrees. Therefore, the total capacitive voltage Vc1+Vc2 is kept fixed during the operation of the power converting apparatus 1-10.

However, if variation occurs in the driving of the first and second switches S1 and S2, as indicated by a waveform Wee, the capacitive voltage Vc1 and the capacitive voltage Vc2 sometimes gradually deviate from each other. However, irrespective of how the capacitive voltage Vc1 and the capacitive voltage Vc2 deviate from each other, the total capacitive voltage Vc1+Vc2 is fixed and does not fluctuate.

Figure 25:
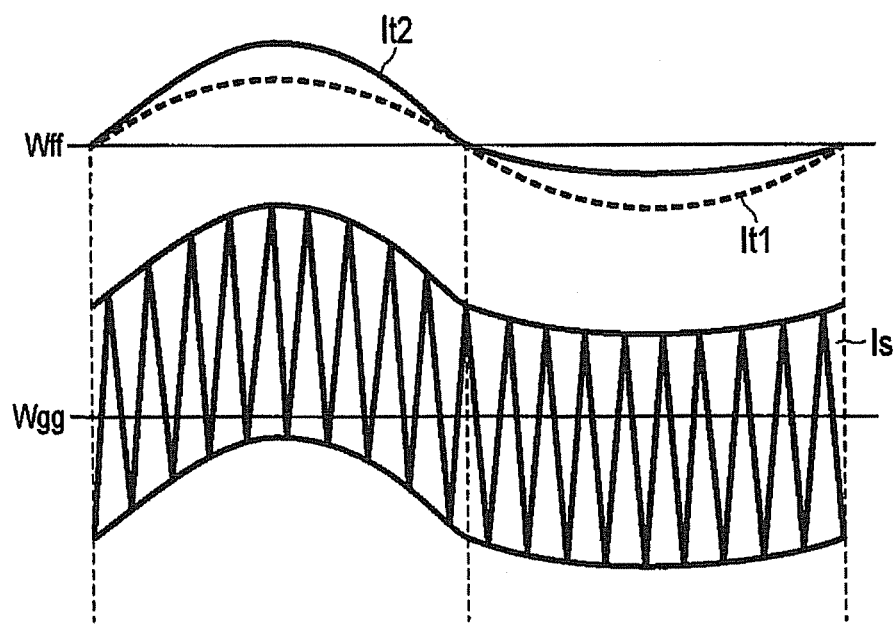
FIG. 25 is a waveform chart used for explaining a compensation procedure taken when the imbalance occurs between the capacitive voltages of the first capacitor and the second capacitor.

FIG. 25 is a waveform chart for explaining action taken when the capacitive voltage Vc1 of the first capacitor C1 decreases and the capacitive voltage Vc2 of the second capacitor C2 increases and imbalance occurs between the capacitive voltage Vc1 and the capacitive voltage Vc2. In FIG. 25, a waveform Wff indicates a target current value determined by the current-target-value determining section 121.

In the waveform Wff, a broken line indicates a current value It1 set as a target when there is no variation between the capacitive voltage Vc1 and the capacitive voltage Vc2. A positive side and a negative side of the broken line are symmetrical. A solid line indicates a current value It2 set as a target when there is a relation of Vc1<Vc2 between the capacitive voltage Vc1 and the capacitive voltage Vc2, that is, when a value Vc1−Vc2 obtained by subtracting the capacitive voltage Vc2 from the capacitive voltage Vc1 is negative. In this case, the imbalance detecting section 132 gives the negative imbalance signal (−) to the current target value determining section 121. Therefore, the current-target-value determining section 121 multiplies the coefficient k with the coefficient h2. As a result, if the power supply voltage Vin is positive, a waviness degree of the target current value It2 increases. Conversely, if the power supply voltage Vin is negative, the waviness degree of the target current value It2 decreases.

The envelope generating section 122 adds the width d to a signal equivalent to the current value It2 determined by the current-target-value determining section 121 to generate the positive envelope +e. The envelope generating section 122 subtracts the width d from the signal equivalent to the current value It2 to generate the negative envelope −e. The envelope generating section 122 supplies a signal equivalent to the positive envelope +e to the first input terminal of the rising determining section 123 and supplies a signal equivalent to the negative envelope −e to the first input terminal of the falling determining section 124.

Consequently, as indicated by a waveform Wgg in FIG. 25, the circuit current Is having the same width of amplitude but having different waviness degrees when the power supply voltage Vin is positive and when the power supply voltage Vin is negative flows to the load M. As a result, if the power supply voltage Vin is positive, an amount of charges charged in the first capacitor C1 increases and, if the power supply voltage Vin is negative, an amount of charges discharged from the second capacitor C2 increases. As a result, the imbalance between the capacitive voltage Vc1 and the capacitive voltage Vc2 is eliminated.

Figure 26:
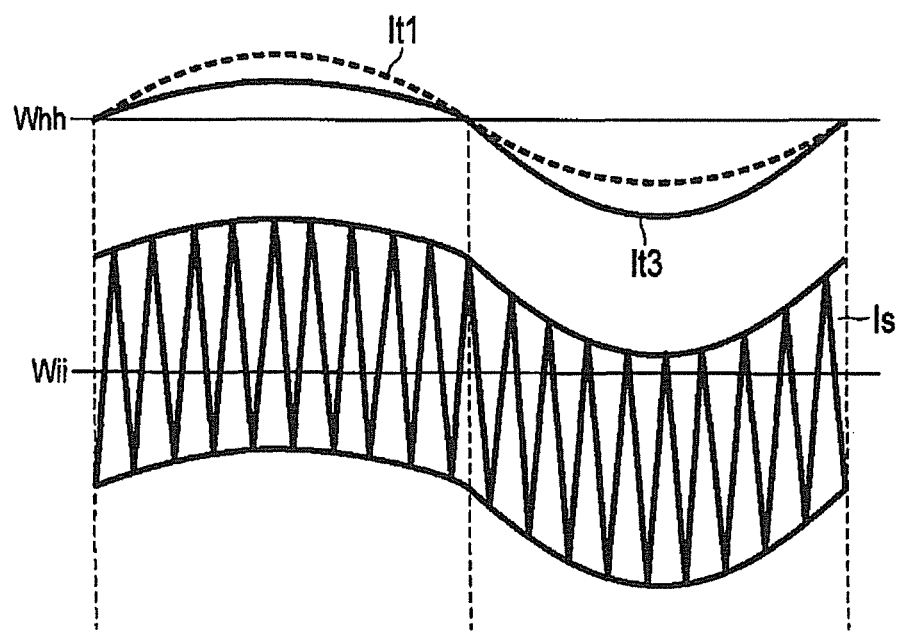
FIG. 26 is a waveform chart used for explaining a compensation procedure taken when the imbalance occurs between the capacitive voltages of the first capacitor and the second capacitor.

FIG. 26 is a waveform chart for explaining action taken when the capacitive voltage Vc1 of the first capacitor C1 increases and the capacitive voltage Vc2 of the second capacitor C2 decreases and imbalance occurs between the capacitive voltage Vc1 and the capacitive voltage Vc2. In FIG. 26, a waveform Whh indicates a target current value determined by the current-target-value determining section 121.

In the waveform Whh, a broken line indicates the current value It1 set as a target when there is no variation between the capacitive voltage Vc1 and the capacitive voltage Vc2. A positive side and a negative side of the broken line are symmetrical. A solid line indicates a current value It3 set as a target when there is a relation of Vc1>Vc2 between the capacitive voltage Vc1 and the capacitive voltage Vc2, that is, when a value Vc1−Vc2 obtained by subtracting the capacitive voltage Vc2 from the capacitive voltage Vc1 is positive. In this case, the imbalance detecting section 132 gives the positive imbalance signal (+) to the current target value determining section 121. Therefore, the current-target-value determining section 121 multiplies the coefficient k with the coefficient h1. As a result, if the power supply voltage Vin is positive, a waviness degree of the target current value It3 decreases. Conversely, if the power supply voltage Vin is negative, the waviness degree of the target current value It3 increases.

The envelope generating section 122 adds the width d to a signal equivalent to the current value It3 determined by the current-target-value determining section 121 to generate the positive envelope +e. The envelope generating section 122 subtracts the width d from the signal equivalent to the current value It3 to generate the negative envelope −e. The envelope generating section 122 supplies a signal equivalent to the positive envelope +e to the first input terminal of the rising determining section 123 and supplies a signal equivalent to the negative envelope −e to the first input terminal of the falling determining section 124.

Consequently, as indicated by a waveform Wii in FIG. 26, the circuit current Is having the same width of amplitude but having different waviness degrees when the power supply voltage Vin is positive and when the power supply voltage Vin is negative flows to the load M. As a result, if the power supply voltage Vin is positive, an amount of charges discharged from the first capacitor C1 increases and, if the power supply voltage Vin is negative, an amount of charges charged in the second capacitor C2 increases. As a result, the imbalance between the capacitive voltage Vc1 and the capacitive voltage Vc2 is eliminated.

As explained above, according to the tenth embodiment, it is possible to maintain the capacitive voltages Vc1 and Vc2 of the first capacitor C1 and the second capacitor C2 within a proper range. Therefore, it is possible to prevent the capacitors from exceeding a withstanding voltage to be damaged and prevent a circuit operation from becoming unstable because of voltage insufficiency. This is easily used industrially because balance can be maintained with relatively simple control.

Note that, in the tenth embodiment, the imbalance detecting section 132 is provided in the controller 12-6 in the sixth embodiment. However, the imbalance detecting section 132 may be provided in the controllers 12-3 to 12-5 or 12-7 to 12-9 in the third to fifth or the seventh to ninth embodiments. In that case, the action and effects explained in the tenth embodiment can also be attained.

Eleventh Embodiment

An eleventh embodiment is explained. As explained in the fourth embodiment, if the input power is increased, the coefficient k is increased by the function of the capacitive-voltage negative feedback section 128. Then, the waviness degree of the target current value It increases. As explained in the sixth embodiment, if the output power is reduced, the coefficient J is reduced by the function of the load-voltage negative feedback section 131. Then, the interval between the positive envelope +e and the negative envelope −e decreases.

Figure 28:
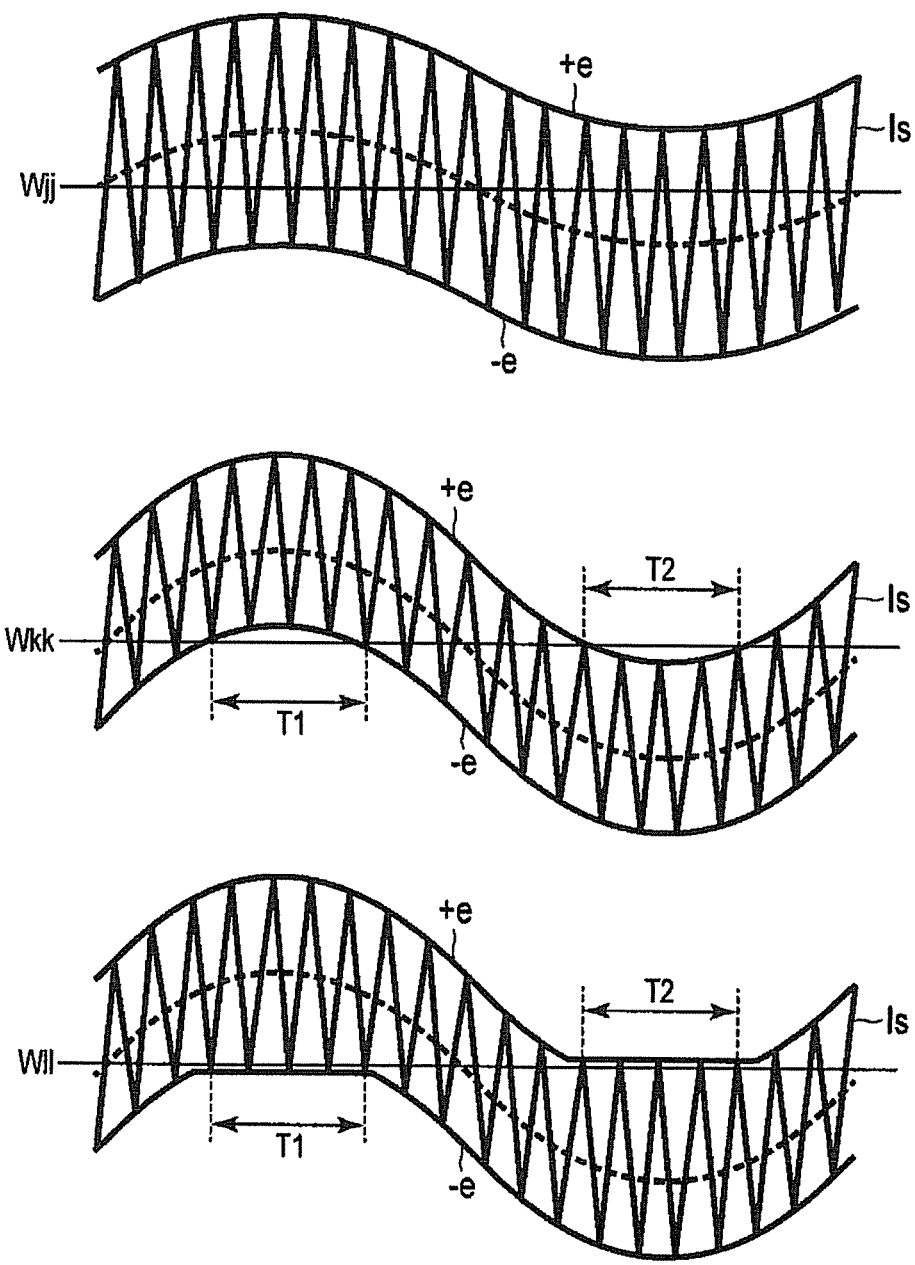
FIG. 28 is a waveform chart used for explanation of the operation of the controller.

In FIG. 28, a waveform Wjj indicates the circuit current Is in the normal state. If the input power is increased and the output power is reduced from this state, as explained above, the coefficient k is increased to increase the waviness degree of the target current value It and the coefficient J is reduced to reduce the interval between the envelopes. As a result, the envelopes sometimes can enter regions of polarities on the opposite sides.

In FIG. 28, a waveform Wkk indicates the circuit current Is obtained when the negative envelope −e enters the positive region in a section T1 and the positive envelope +e enters the negative region in a section T2. In this case, the circuit current Is, which should originally repeatedly change to positive and negative, continues to take positive values in the section T1 and continues to take negative values in the section T2. Therefore, correct switching is not performed while the circuit current Is continues to take the positive values and while the circuit current Is continues to take the negative values. Therefore, an excessively large power loss occurs. The eleventh embodiment eliminates such a deficiency.

A power converting apparatus 1-11 in the eleventh embodiment includes a power conversion circuit 11-11 and a controller 12-11 for the power conversion circuit 11-11. The power conversion circuit 11-11 includes a configuration same as the configuration of the power conversion circuit 11-10 in the tenth embodiment. Therefore, explanation of the power conversion circuit 11-11 is omitted.

Figure 27:
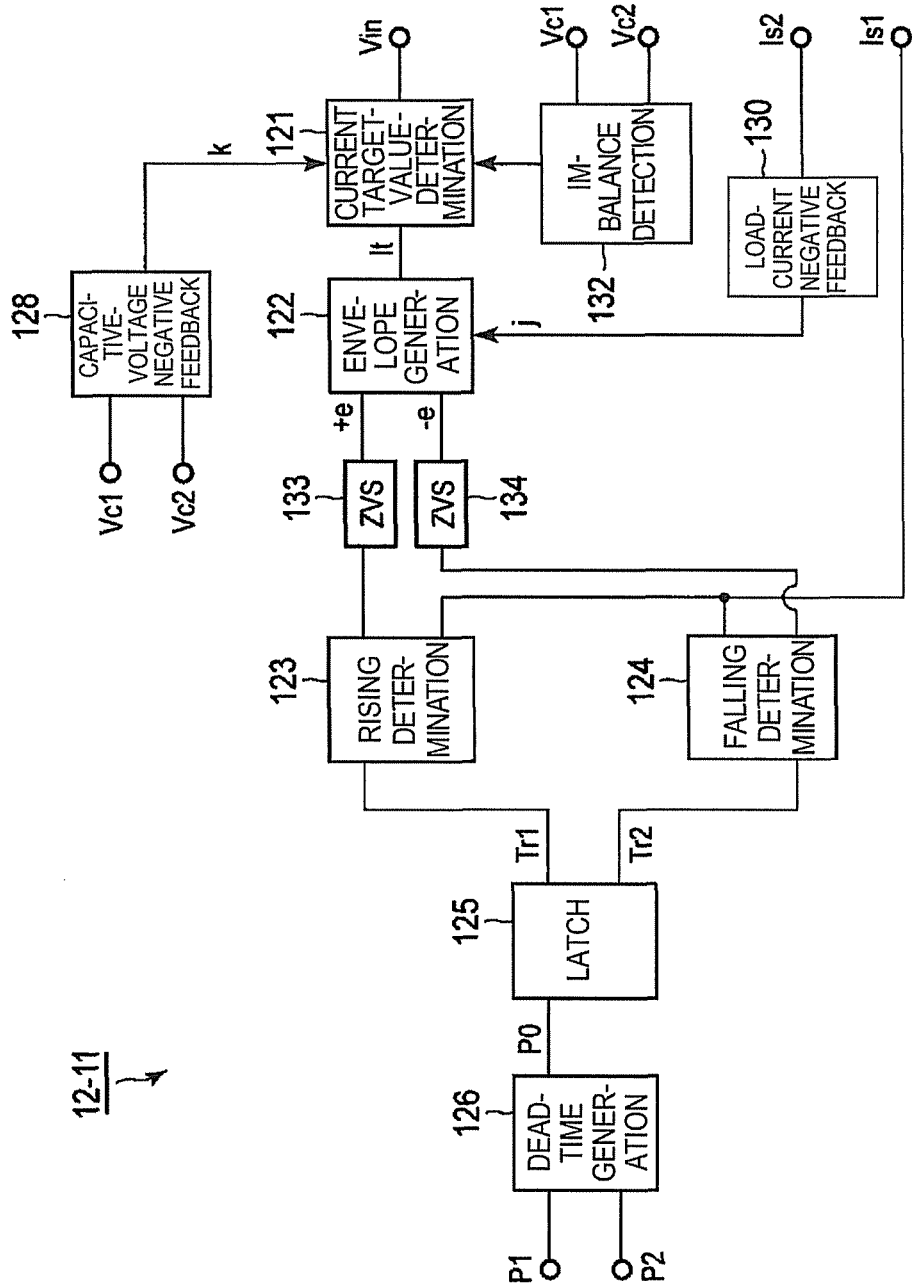
FIG. 27 is a block diagram showing a specific configuration of a controller in an eleventh embodiment.

FIG. 27 is a block diagram showing a specific configuration of the controller 12-11. The controller 12-11 includes first and second ZVS (Zero Volt Switching) compensating sections 133 and 134 in addition to the current-target-value determining section 121, the envelope generating section 122, the rising determining section 123, the falling determining section 124, the latch circuit 125, the dead-time generating section 126, the capacitive-voltage negative feedback section 128, the load-voltage negative feedback section 131, and the imbalance detecting section 132.

The first ZVS compensating section 133 receives, as an input, the positive envelope +e generated by the envelope generating section 122. The first ZVS compensating section 133 verifies whether the positive envelope +e is at a lower limit value Amin of the positive region. If the positive envelope +e is higher than the lower limit value Amin of the positive region, the first ZVS compensating section 133 directly gives the positive envelope +e to the rising determining section 123. On the other hand, if the positive envelope +e is lower than the lower limit value Amin, the first ZVS compensating section 133 unconditionally replaces the positive envelope +e with the lower limit value Amin. That is, the first ZVS compensating section 133 gives the lower limit value Amin to the rising determining section 123 as the positive envelope +e (a first compensating section in claims).

The second ZVS compensating section 134 receives, as an input, the negative envelope −e generated by the envelope generating section 122. The second ZVS compensating section 134 verifies whether the negative envelope −e is at an upper limit value Bmax of the negative region. If the negative envelope −e is lower than the upper limit value Bmax of the negative region, the second ZVS compensating section 134 directly gives the negative envelope −e to the falling determining section 124. On the other hand, if the negative envelope −e is higher than the upper limit value Bmax, the second ZVS compensating section 134 unconditionally replaces the negative envelope −e with the upper limit value Bmax. That is, the second ZVS compensating section 134 gives the upper limit value Bmax to the falling determining section 124 as the negative envelope −e (a second compensating section in claims).

The operations of the current-target-value determining section 121, the envelope generating section 122, the capacitive-voltage negative feedback section 128, the load-voltage negative feedback section 131, and the imbalance detecting section 132 in a pre-stage of the first and second ZVS compensating sections 133 and 134 and the rising determining section 123, the falling determining section 124, and the latch circuit 125 in a post-stage of the first and second ZVS compensating sections 133 and 134 are the same as the operations in the tenth embodiment.

A waveform Wll in FIG. 28 indicates the circuit current Is subjected to ZVS compensation when the circuit current Is indicated by the waveform Wkkk in the figure is obtained. As indicated by the waveform Wll, in the section T1 in which the negative envelope −e is higher than the negative upper limit value Bmax, the second ZVS compensating section 134 replaces the negative envelope −e with the negative upper limit value Bmax. Therefore, the negative envelope −e does not enter the positive region.

Similarly, in the section T2 in which the positive envelope +e is lower than the negative lower limit value Amin, the first ZVS compensating section 133 replaces the positive envelope +e with the positive lower limit value Amin. Therefore, the positive envelope +e does not enter the negative region either.

Therefore, the circuit current Is always repeatedly changes to positive and negative. Therefore, voltages between both ends of the switches S1 and S2 are always zero when the first switch S1 or the second switch S2 is turned on. Therefore, it is possible to obtain a switching operation with an extremely small power loss.

Note that, in the eleventh embodiment, the first and second ZVS compensating sections 133 and 134 are provided in the controller 12-10 in the tenth embodiment. However, the first and second ZVS compensating sections 133 and 134 may be provided in the controllers 12-3 to 12-9 in the third to ninth embodiments. Even in that case, the action and effects explained in the eleventh embodiment can be attained.

Other Embodiments

The present invention is not limited to the embodiments explained above.

For example, in the embodiments, the alternating-current power supply E of a single phase is used. However, the alternating-current power supply E is not limited to the single phase. An alternating-current power supply of three or more phases can also be used.

In the embodiments, the high-pass filter HPF is provided in the route that bypasses the alternating-current power supply E and the low-pass filter LPF. However, the high-pass filter HPF may be omitted.

In the embodiments, the MOS field effect transistor is exemplified as the first and second switches S1 and S2. However, the first and second switches S1 and S2 are not limited to the MOS field effect transistor. For example, the first and second switches S1 and S2 may be switches including semiconductor devices such as a bipolar transistor, IGBT, GaN, and SiC. Alternatively, a mechanical switch such as a relay and a diode may be combined to form the first and second switches S1 and S2.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A power converting apparatus comprising:
   a power conversion circuit including a route that connects a first switch and a second switch in series and connects a first capacitor and a second capacitor in series, connects the first switch and the first capacitor and connects the second switch and the second capacitor to form a closed loop, connects a connection point of the first switch and the second switch and a connection point of the first capacitor and the second capacitor through a parallel circuit of a first series circuit of an alternating-current power supply, a low-pass filter, and a first inductor and a second series circuit of a second inductor, a third capacitor, and a load, and bypasses the alternating-current power supply and the low-pass filter;
   a circuit-current detecting section configured to detect a circuit current flowing through the power conversion circuit;
   a power-supply-voltage detecting section configured to detect a power supply voltage of the alternating-current power supply; and
   a control section configured to output, to the first switch and the second switch, on a basis of the circuit current detected by the circuit-current detecting section and the power supply voltage detected by the power-supply-voltage detecting section, a pulse signal for alternately opening and closing the first switch and the second switch such that an electric current in which a high-frequency component is mixed with a low-frequency component of the alternating-current power supply flows through the power conversion circuit.

2. The apparatus according to claim 1, wherein the control section includes:
   a first determining section configured to determine, on a basis of a signal of the power supply voltage detected by the power-supply-voltage detecting section, a target value of the electric current flowing through the power conversion circuit;

an envelope generating section configured to give predetermined width to the target value of the electric current determined by the first determining section and generate positive and negative envelopes;

a second determining section configured to determine whether the circuit current detected by the circuit-current detecting section is within a range of the positive envelope and the negative envelope; and a pulse generating section configured to generate the pulse signal at timing when it is determined by the second determining section that the circuit current deviates from the range of the positive envelope and the negative envelope.

3. The apparatus according to claim 2, further comprising:

a first capacitive-voltage detecting section configured to detect, as a first capacitive voltage, a potential difference between both ends of the first capacitor; and a second capacitive-voltage detecting section configured to detect, as a second capacitive voltage, a potential difference between both ends of the second capacitor, wherein the control section further includes a capacitive-voltage negative feedback section configured to adjust, on a basis of the first capacitive voltage and the second capacitive voltage, the target value of the electric current determined by the first determining section.

4. The apparatus according to claim 2, wherein the control section further includes a circuit-current negative feedback section configured to adjust an interval between the positive envelope and the negative envelope on a basis of a value of the circuit current.

5. The apparatus according to claim 2, wherein the control section further includes:

a first compensating section configured to set a lower limit value in a positive region of the positive envelope generated by the envelope generating section and replace a value of the positive envelope with the lower limit value if the positive envelope is lower than the lower limit value; and a second compensating section configured to set an upper limit value in a negative region of the negative envelope generated by the envelope generating section and replace a value of the negative envelope with the upper limit value if the negative envelope is higher than the upper limit value.

* * * * *